United States Patent
Pollard et al.

(10) Patent No.: US 10,793,169 B2
(45) Date of Patent: Oct. 6, 2020

(54) MECHANICALLY ACTIVATED CAM EXTENSION CYLINDER

(71) Applicant: Westinghouse Air Brake Technologies Corporation, Wilmerding, PA (US)

(72) Inventors: Timothy Edward Pollard, Dyer, IN (US); Michael Anthony Koziol, Berwyn, IL (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 92 days.

(21) Appl. No.: 16/026,485

(22) Filed: Jul. 3, 2018

(65) Prior Publication Data

US 2019/0009803 A1    Jan. 10, 2019

Related U.S. Application Data

(60) Provisional application No. 62/529,190, filed on Jul. 6, 2017.

(51) Int. Cl.
*B61H 13/20* (2006.01)
*F16H 25/18* (2006.01)
(Continued)

(52) U.S. Cl.
CPC ............ *B61H 13/20* (2013.01); *B60T 13/665* (2013.01); *B60T 17/228* (2013.01); *F15B 7/005* (2013.01); *F15B 7/08* (2013.01); *F16H 25/186* (2013.01)

(58) Field of Classification Search
CPC ....... B61D 1/00; B60T 13/665; B60T 17/081; B60T 7/107; B60T 17/08; B60T 17/083;
(Continued)

(56) References Cited

U.S. PATENT DOCUMENTS

| | | | | |
|---|---|---|---|---|
| 4,467,704 A | * | 8/1984 | Casalone | ............... B60T 17/08 188/343 |
| 5,495,921 A | * | 3/1996 | Samulak | ............... B61H 13/24 188/196 V |

(Continued)

FOREIGN PATENT DOCUMENTS

JP        2009243694 A        10/2009

OTHER PUBLICATIONS

International Preliminary Report on Patentability for corresponding International Application No. PCT/US2018/040870 dated Jan. 7, 2020. (10 pages).

*Primary Examiner* — Robert A. Siconolfi
*Assistant Examiner* — San M Aung
(74) *Attorney, Agent, or Firm* — The Small Patent Law Group LLC; Mary D. Lawlor

(57) ABSTRACT

A brake actuator for a brake rigging in a brake system includes a brake cylinder; a piston rod disposed on the brake cylinder and connected to a piston assembly in the brake cylinder, the piston rod being configured to be moved by the piston assembly in a reciprocal axial motion and including at least one lateral protrusion extending therefrom; and an extension cylinder disposed on the brake cylinder at least partially surrounding the piston rod, the extension cylinder including at least one cam surface engaged by the at least one lateral protrusion of the piston rod. The extension cylinder is configured to be connected to a hand brake mechanism and to be actuated by the hand brake mechanism to rotate such that the cam surface engages the lateral protrusion of the piston rod to cause the piston rod to move to the extended position.

20 Claims, 21 Drawing Sheets

(51) Int. Cl.
*F15B 7/08* (2006.01)
*F15B 7/00* (2006.01)
*B60T 17/22* (2006.01)
*B60T 13/66* (2006.01)

(58) Field of Classification Search
CPC .......... B60T 17/086; F15B 7/005; F15B 7/08; F16H 25/186; B61H 13/20; F16D 2121/02; F16D 2121/14; F16D 2123/00; F16D 2125/28; F16D 2127/007; F16D 2127/06; F16D 55/2245; F16D 651/18; F16D 651/28; F16D 2121/12; F16D 2125/40; F16D 2125/64; F16D 2125/66; F16D 2125/68; F16D 2125/582; F16D 2127/04; Y10T 74/18992
USPC ........................................ 303/22.6; 188/72.6
See application file for complete search history.

(56) References Cited

U.S. PATENT DOCUMENTS

| | | |
|---|---|---|
| 6,698,552 B2 | 3/2004 | Huber, Jr. et al. |
| 2003/0024774 A1 | 2/2003 | Huber, Jr. et al. |
| 2006/0054431 A1* | 3/2006 | Gilles ................ F16D 65/18 188/265 |
| 2008/0179144 A1 | 7/2008 | Sommerfeld et al. |
| 2010/0294601 A1* | 11/2010 | Kraus ................ F16D 65/28 188/72.2 |
| 2012/0043169 A1* | 2/2012 | Ebner ................ B60T 17/081 188/72.6 |
| 2016/0288807 A1* | 10/2016 | Huber, Jr. ............ B61H 13/34 |

* cited by examiner

MECHANICALLY ACTIVATED CAM EXTENSION CYLINDER

CROSS REFERENCE TO RELATED APPLICATIONS

The present application claims priority from U.S. Provisional Patent Application No. 62/529,190, filed on Jul. 6, 2017, which is hereby incorporated by reference in its entirety.

BACKGROUND OF THE INVENTION

Field of the Invention

The present invention relates generally to a railway brake system. In particular, the present invention relates to a brake actuator having an extension cylinder operatively connecting a piston rod to a hand brake mechanism and providing a lever ratio between the brake actuator and the hand brake mechanism.

Description of Related Art

Applicant's prior U.S. Pat. No. 8,006,815, which is hereby incorporated by reference in its entirety, is directed to a parking brake assembly for a railway brake system. The assembly includes a ratchet mounted for rotation on a threaded piston rod of a brake actuator and a holding pawl engageable with the ratchet for maintaining a push rod of the parking brake assembly to apply braking force when the air pressure is lost in the brake pipe and releasing the push rod to accordingly release the braking force when the supply of air pressure in the brake pipe is restored. An operating lever and a cylinder connected thereto are provided for selectively rotating the holding pawl. A valve is provided for supplying air pressure to and evacuating pressure from the cylinder. A release mechanism is provided for manually releasing the braking force. The parking brake assembly incorporates a hand brake mechanism that includes a hand wheel and chain operatively connected to the brake actuator to manually engage the brake rigging with the wheels in a parking situation when the railway car is removed from service and parked at a siding or yard.

SUMMARY OF THE INVENTION

According to the examples of the present disclosure, a brake actuator is provided with a mechanism for increasing the hand brake force applied to the brake rigging through the use of a lever ratio directly applied to the brake actuator. The lever ratio is applied via an extension cylinder disposed on the brake actuator that incorporates a ramp surface operatively engaging the piston rod of the brake actuator.

According to one example of the present disclosure, a brake actuator for a brake rigging in a railway brake system is provided. The brake actuator comprises a brake cylinder; a piston rod extensibly disposed on the brake cylinder and operatively connected to a piston assembly in the brake cylinder, the piston rod being configured to be moved by the piston assembly in a reciprocal axial motion between extended and retracted positions with respect to the brake cylinder and comprising a lateral protrusion extending laterally therefrom; and an extension cylinder disposed on the brake cylinder surrounding the piston rod, the extension cylinder comprising a cam surface engaged by the lateral protrusion of the piston rod and a lever configured to be engaged by a hand brake mechanism. The extension cylinder is configured to be actuated to rotate such that the cam surface engages the lateral protrusion of the piston rod to cause the piston rod to move to the extended position.

The cam surface of the extension cylinder may comprise a ramp surface extending at a single ramp angle.

The cam surface of the extension cylinder may comprise a ramp surface extending at multiple ramp angles. The ramp angle of the ramp surface is greater in a portion of the ramp surface that engages the lateral protrusion when the piston rod is in the retracted position than in a portion of the ramp surface that engages the lateral protrusion when the piston rod is near the extended position.

The cam surface of the extension cylinder may extend at a single mean diameter.

The cam surface of the extension cylinder may extend at multiple mean diameters.

The extension cylinder may be rotatably supported on a non-pressure head of the brake cylinder by a lifter bearing. The piston rod may be extensibly supported in a non-pressure head of the brake cylinder by a piston rod bearing. The lateral protrusion of the piston rod may be configured to slide along the cam surface of the extension cylinder. The lateral protrusion may comprise a rotatable bearing configured to slide and roll along the cam surface.

The brake actuator may further comprise a positive return stop configured to return the cam surface of the extension cylinder to a starting position with respect to the piston rod when the hand brake mechanism is released.

According to a particular example of the present disclosure, a brake actuator for a brake rigging is provided. The brake actuator comprises a brake cylinder; a piston rod extensibly disposed on the brake cylinder and operatively connected to a piston assembly in the brake cylinder, the piston rod being configured to be moved by the piston assembly in a reciprocal axial motion between extended and retracted positions with respect to the brake cylinder and comprising at least one lateral protrusion extending laterally therefrom; and an extension cylinder disposed on the brake cylinder at least partially surrounding the piston rod, the extension cylinder comprising at least one cam surface engaged by the at least one lateral protrusion of the piston rod. The extension cylinder is configured to be operatively connected to a hand brake mechanism and to be actuated by the hand brake mechanism to rotate such that the at least one cam surface engages the at least one lateral protrusion of the piston rod to cause the piston rod to move to the extended position.

According to another particular example of the present disclosure, a brake cylinder assembly for a railway brake actuator is provided. The brake cylinder assembly comprises a cylinder body; a piston assembly disposed in the cylinder body; a piston rod operatively connected to the piston assembly and configured to be moved by the piston assembly in a reciprocal axial motion between extended and retracted positions with respect to the cylinder body, the piston rod comprising at least one lateral protrusion extending laterally therefrom; and an extension cylinder disposed on the cylinder body at least partially surrounding the piston rod, the extension cylinder comprising at least one cam surface engaged by the at least one lateral protrusion of the piston rod. The extension cylinder is configured to be operatively connected to a hand brake mechanism and to be actuated by the hand brake mechanism to rotate such that the at least one cam surface engages the at least one lateral protrusion of the piston rod to cause the piston rod to move to the extended position.

These and other features and characteristics of the present invention, as well as the methods of operation and functions of the related elements of structures, and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
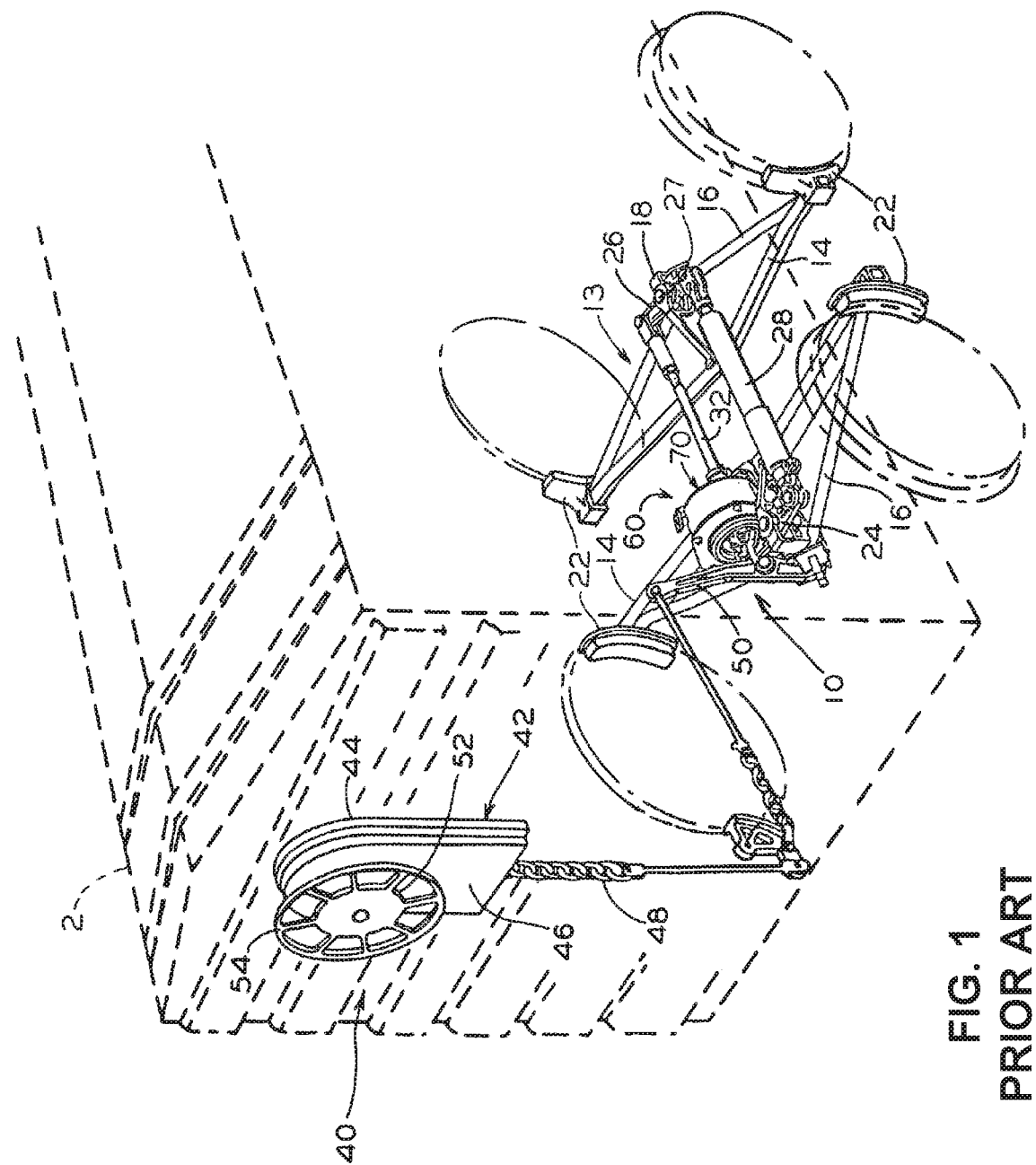
FIG. 1 is a perspective view of a truck-mounted brake rigging including a parking brake assembly with a conventional hand brake apparatus installed on a railway car shown in phantom.
Figure 2:
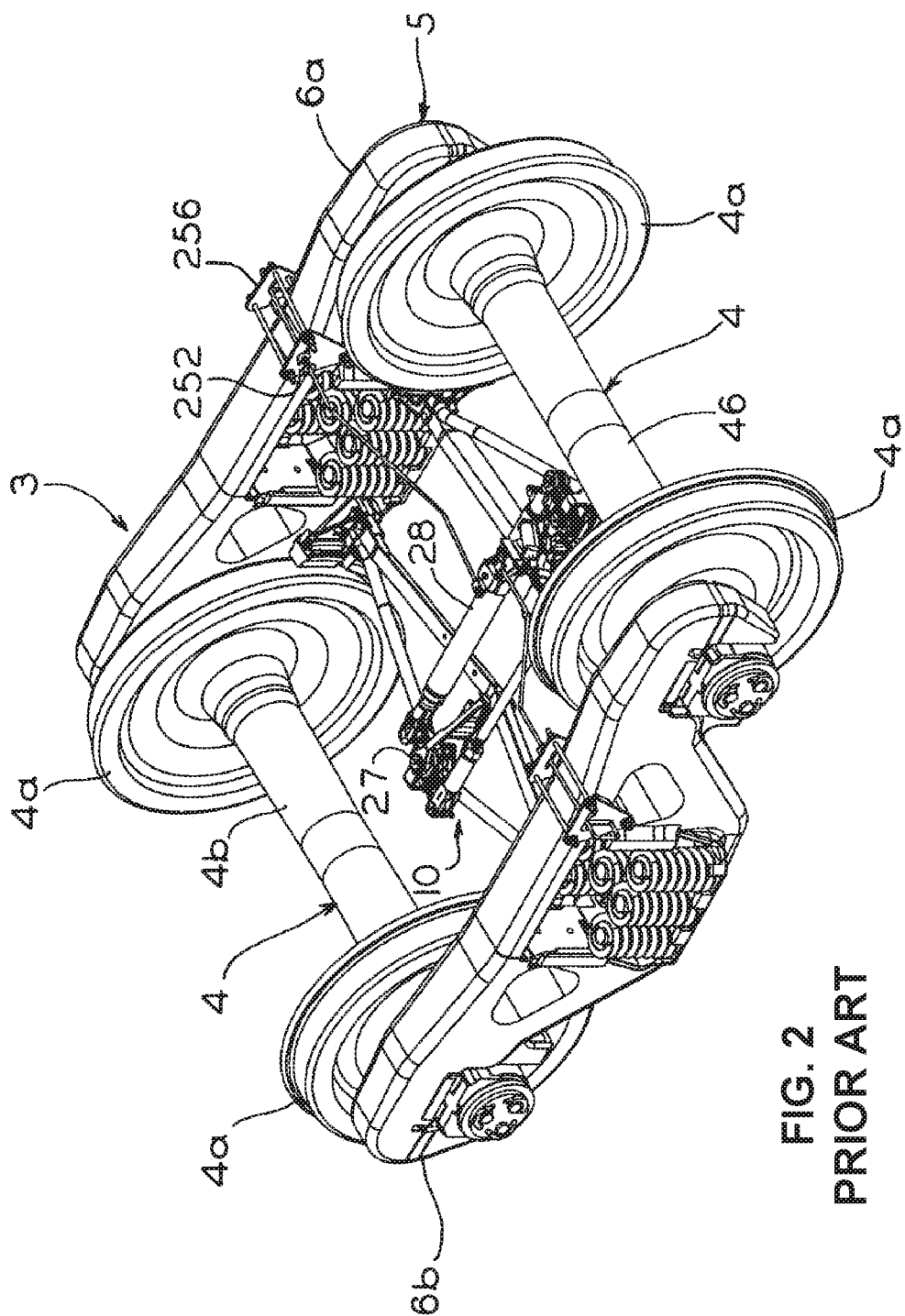
FIG. 2 is a perspective view of a parking brake assembly installed within the truck apparatus of the railway car shown in FIG. 1.
Figure 3:
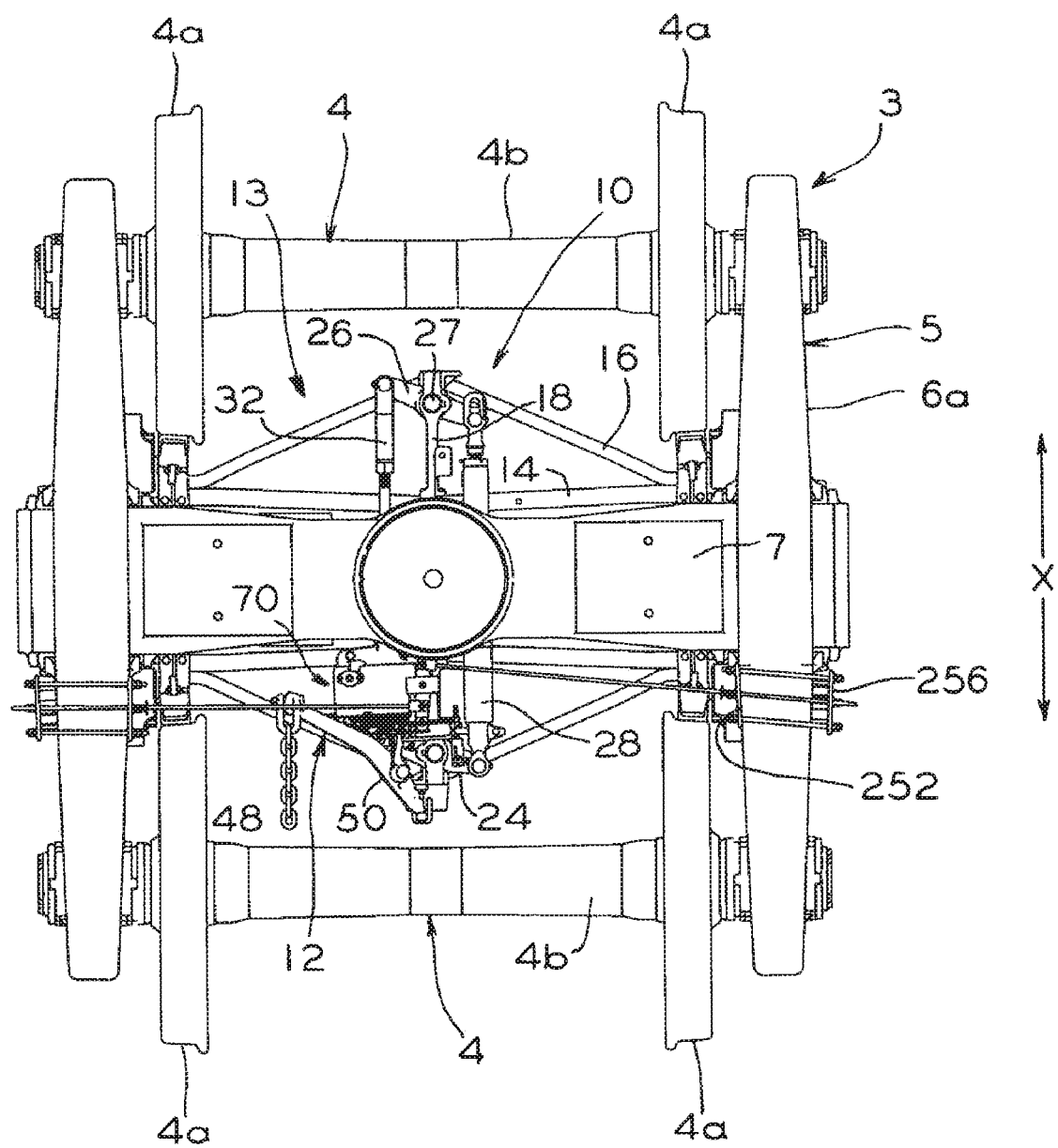
FIG. 3 is a top view of the parking brake assembly of FIG. 2.
Figure 4:
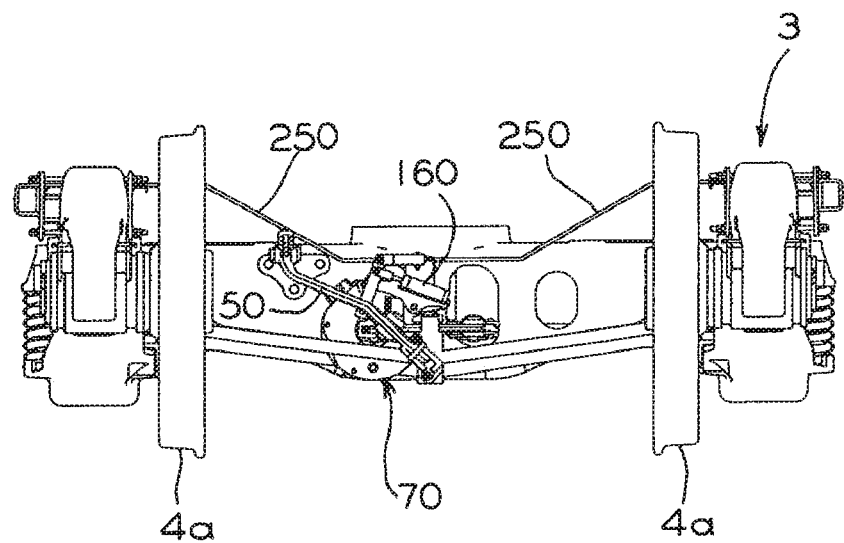
FIG. 4 is a front view of the parking brake assembly of FIG. 2.
Figure 5:
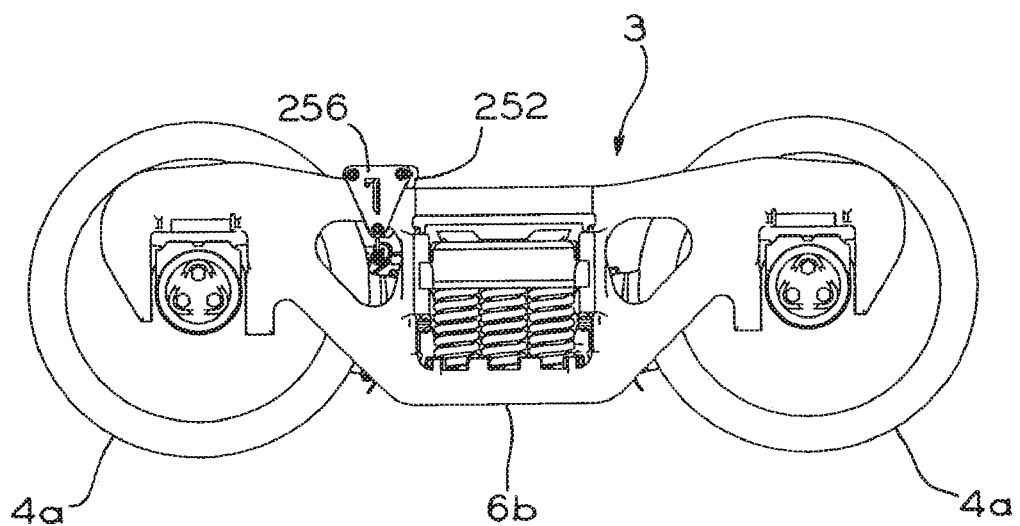
FIG. 5 is a side view of the parking brake assembly of FIG. 2.
Figure 6:
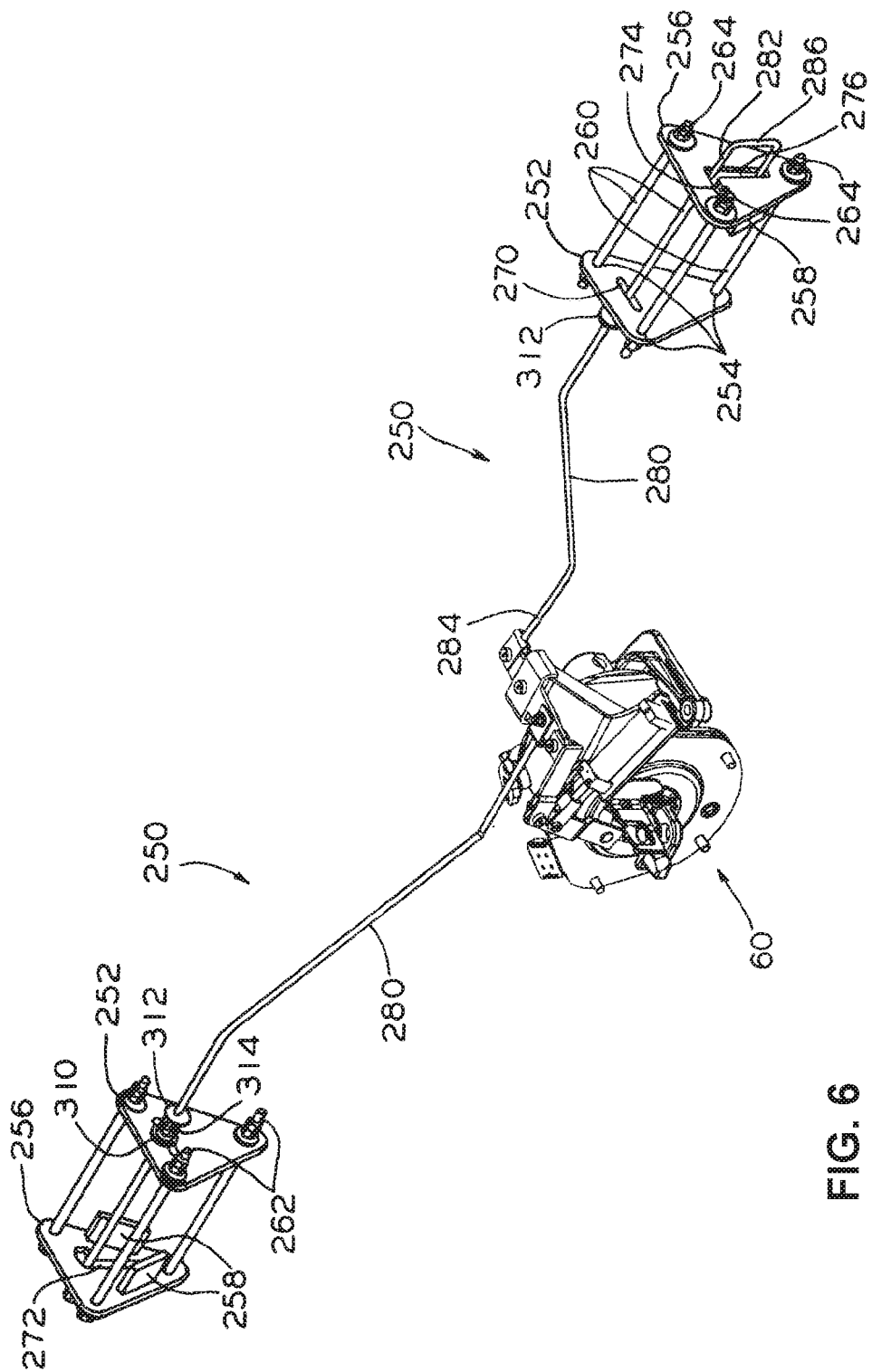
FIG. 6 is an isolation perspective view of the parking brake assembly shown in FIG. 1.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Referring to FIGS. 1-5, a truck-mounted brake rigging, generally designated 10, is shown for a railway car 2 according to an example of U.S. Pat. No. 8,006,815. The brake rigging 10 is installed within a conventional truck apparatus, generally designated as 3, carrying one end of the railway car body. Such truck apparatus 3 includes a pair of wheel sets 4 each having a pair of wheels 4a joined by an axle 4b and a frame 5 supported by the pair of wheel sets 4. The frame 5 includes a pair of side members 6a and 6b joined by a bolster 7.

The brake rigging 10 comprises brake beams, generally designated 12 and 13, which are substantially identical, each such brake beam including a compression member 14, a tension member 16, and a strut member 18. The opposite ends of the compression member 14 and the tension member 16 may be permanently connected together in a conventional manner. Mounted on the respective ends of the brake beams 12 and 13 are brake heads 22. At a location midway between their opposite ends, the compression member 14 and the tension member 16, of the respective brake beams 12 and 13, are spaced apart sufficiently to allow connection of the strut member 18 therebetween.

A pair of force-transfer levers 24 and 26 is pivotally connected by pins 27 to the strut member 18 of the respective brake beams 12 and 13. One end of the force-transfer levers 24 and 26 is interconnected via the force-transmitting member 28, which may be in the form of an automatic slack adjuster device. The opposite end of the respective force-transfer levers 24 and 26 is connected to the pressure head of the brake actuator, generally designated 70, via a force-transmitting member 28 or a return push rod assembly 32.

Figure 11:
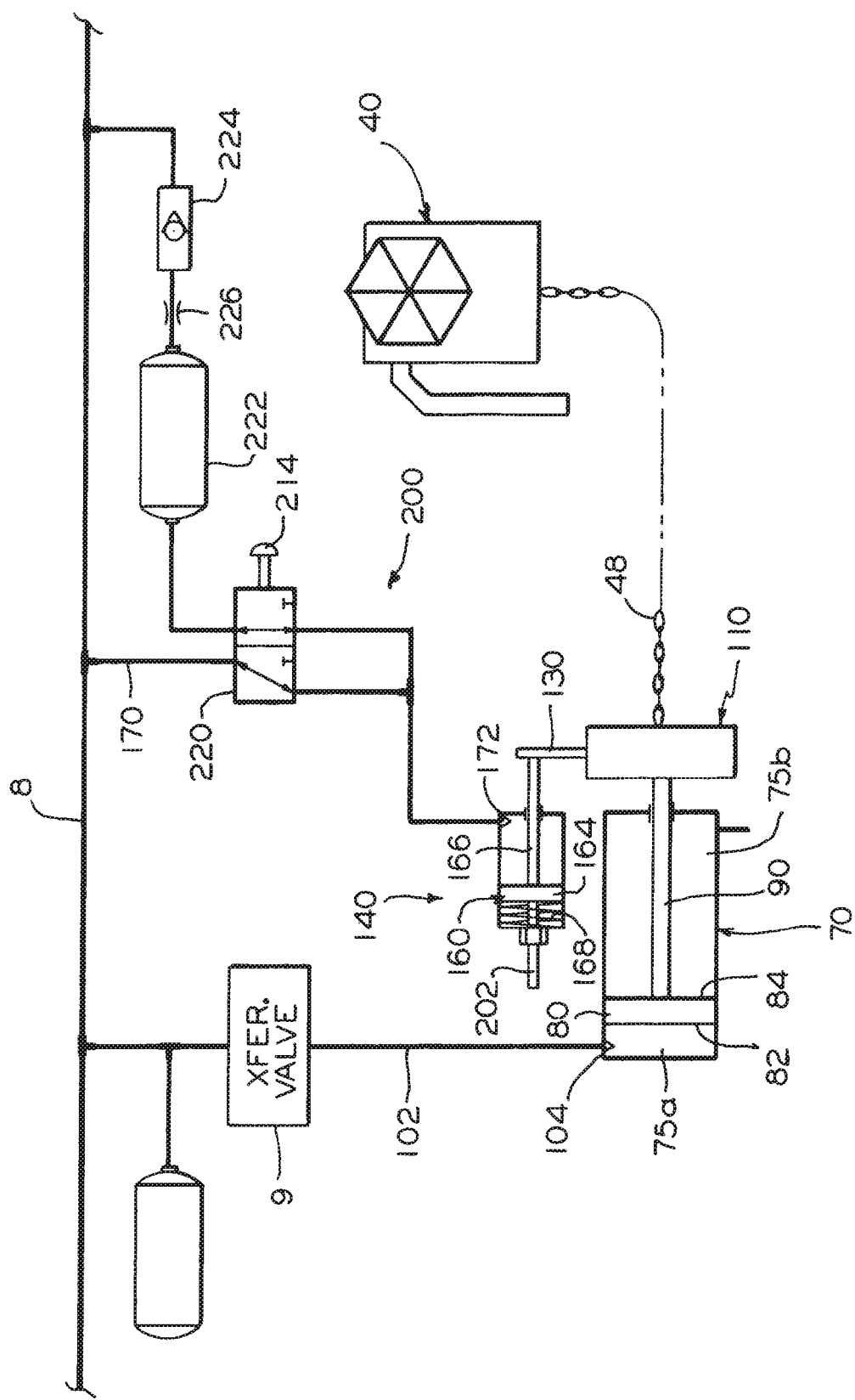
FIG. 11 is a schematic block diagram of the parking brake assembly, particularly illustrating a pneumatically operated manual release arrangement.
Figure 12:
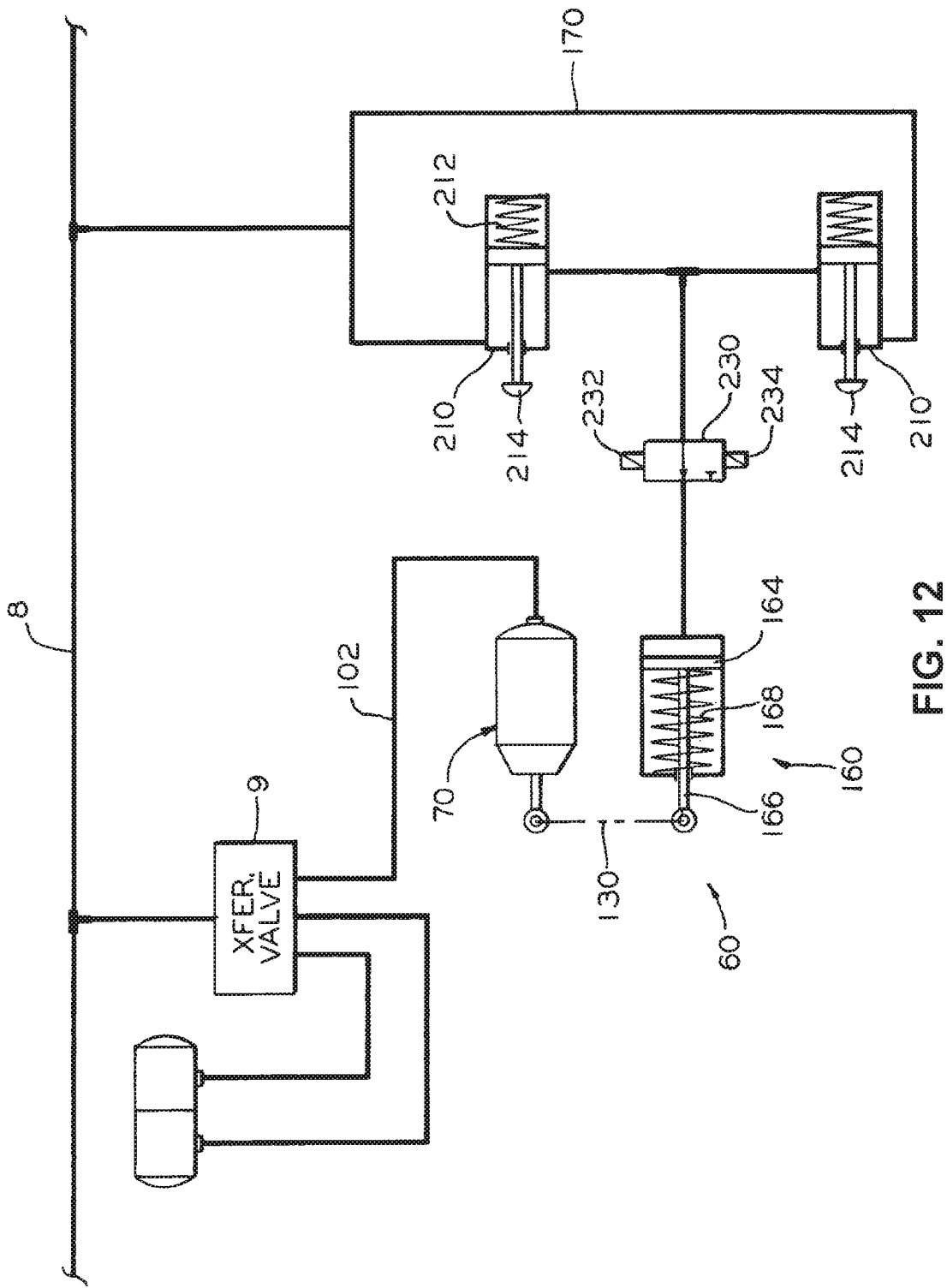
FIG. 12 is a schematic block diagram of the parking brake assembly, particularly illustrating another pneumatically operated manual release arrangement.
Figure 14:
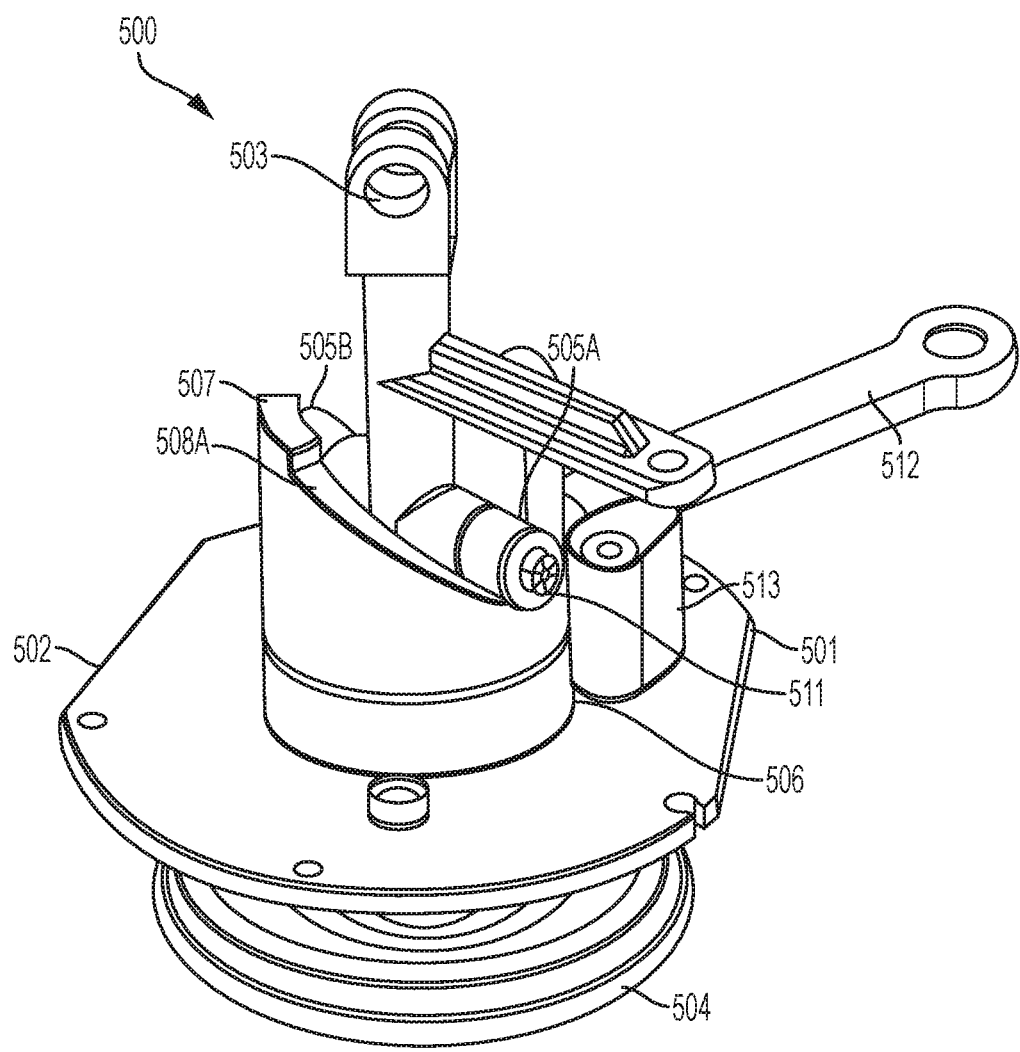
FIG. 14 is a perspective view of a brake cylinder assembly for a railway brake actuator according to an example of the present disclosure.
Figure 15:
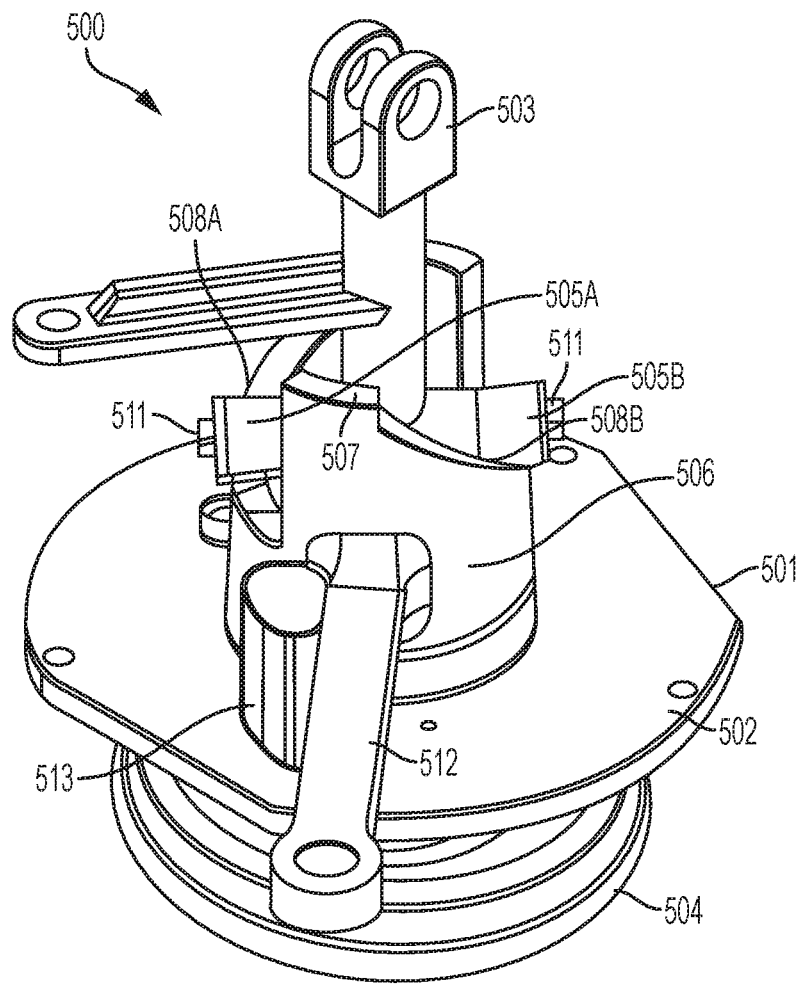
FIG. 15 is another perspective view of the brake cylinder assembly of FIG. 14.
Figure 16:
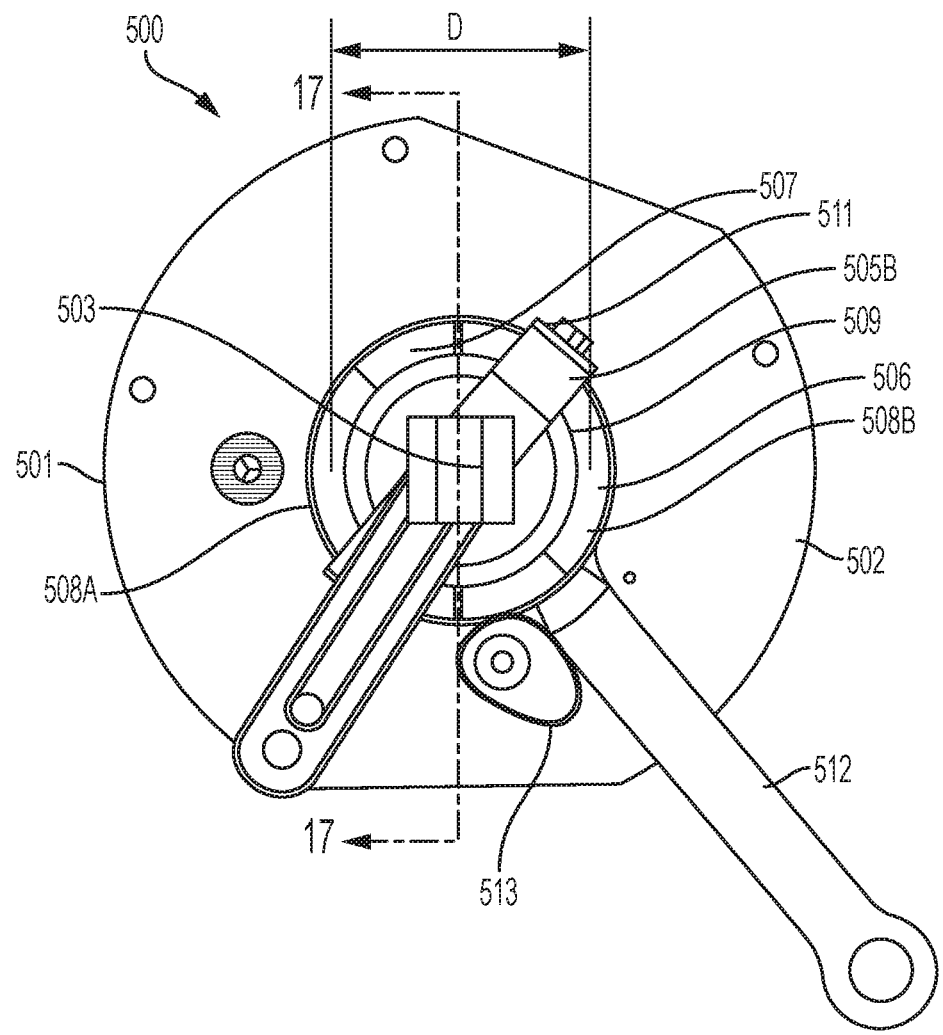
FIG. 16 is a front view of the brake cylinder assembly of FIG. 14.
Figure 17:
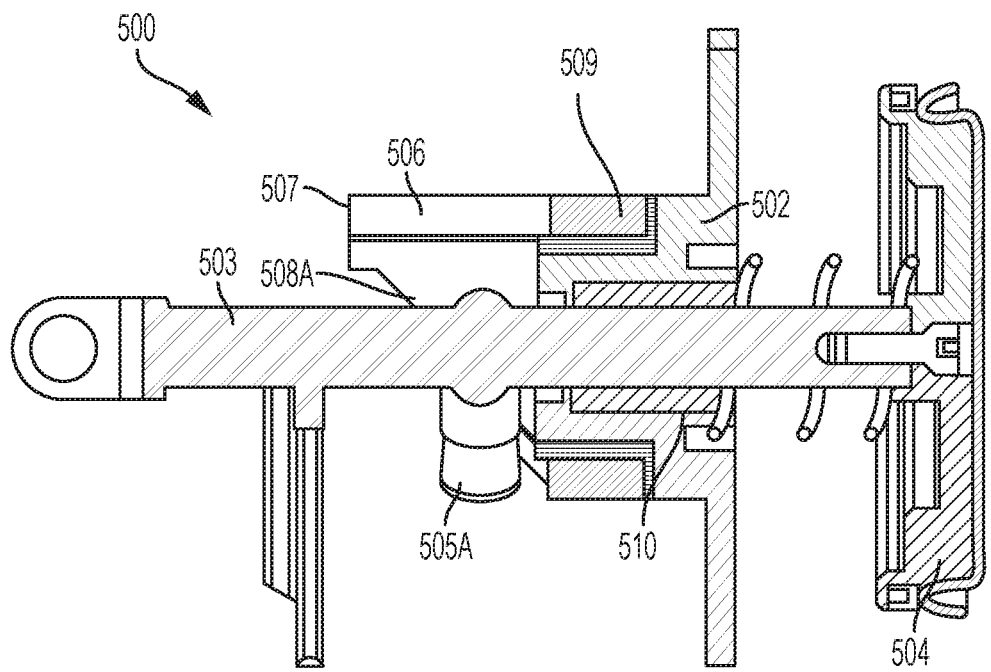
FIG. 17 is a cross-sectional view of the brake cylinder assembly taken along lines 17-17 shown in FIG. 16.
Figure 18:
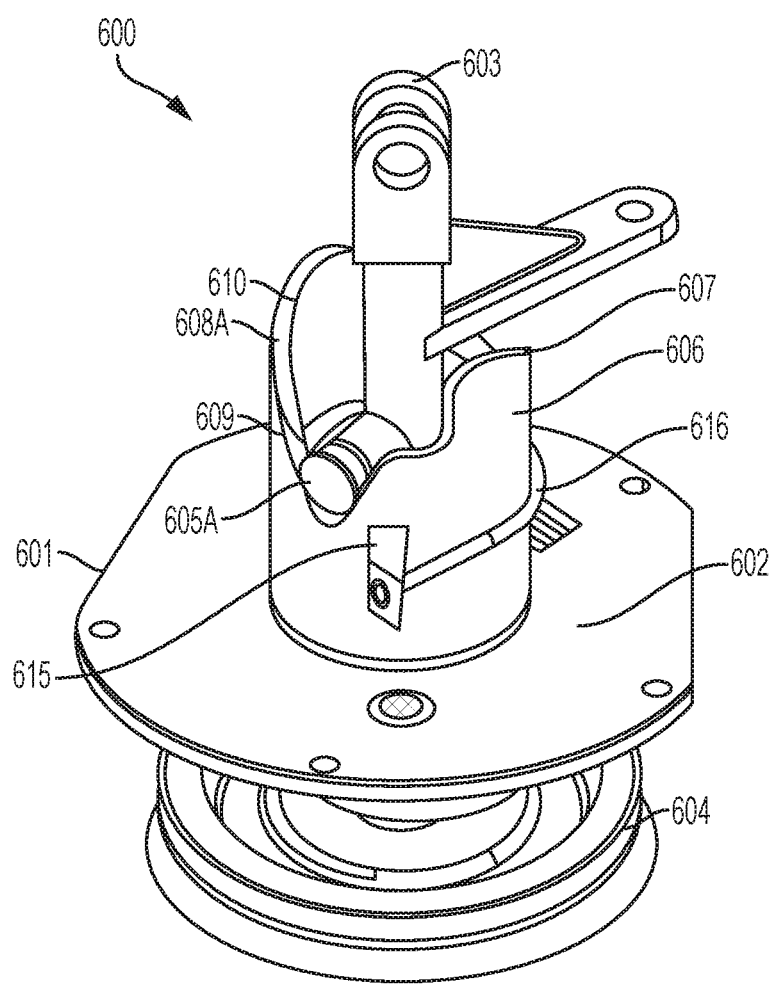
FIG. 18 is a perspective view of a brake cylinder assembly for a railway brake actuator according to another example of the present disclosure.
Figure 19:
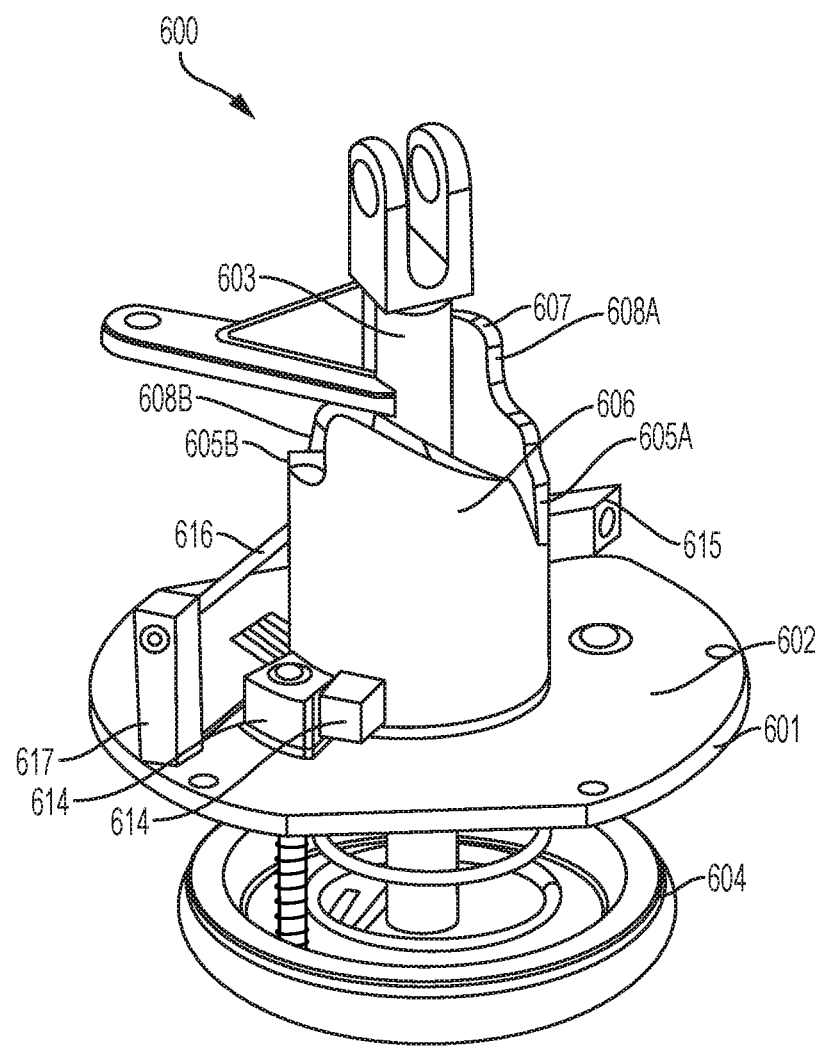
FIG. 19 is another perspective view of the brake cylinder assembly of FIG. 18.
Figure 20:
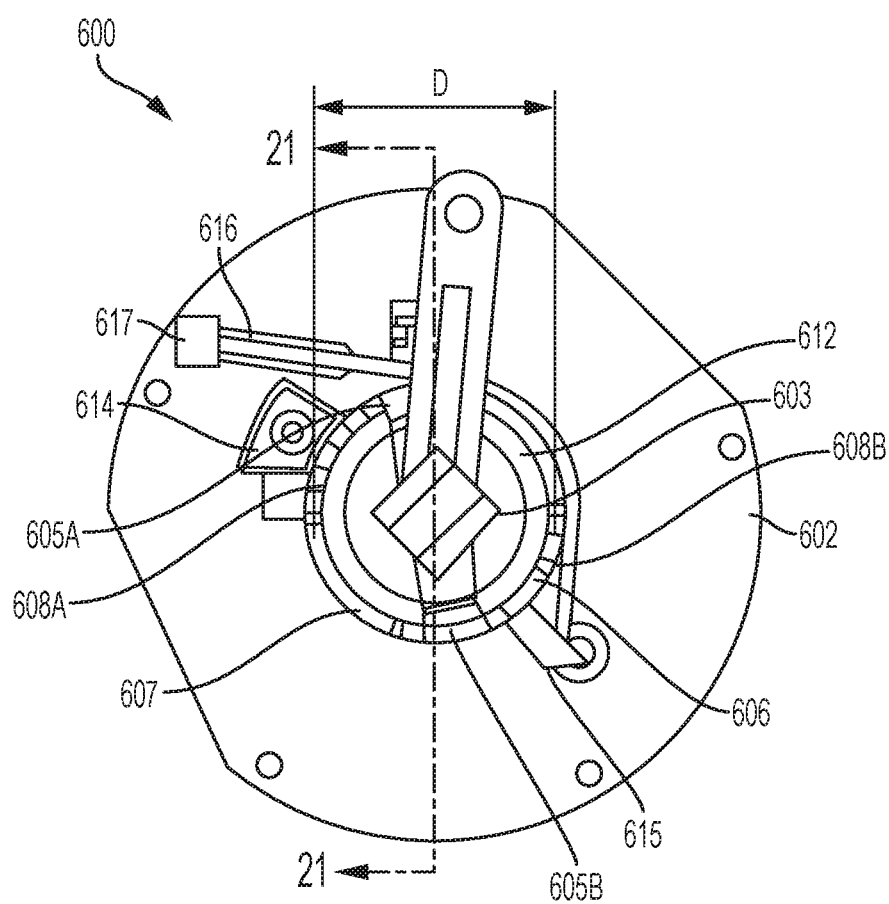
FIG. 20 is a front view of the brake cylinder assembly of FIG. 18.
Figure 21:
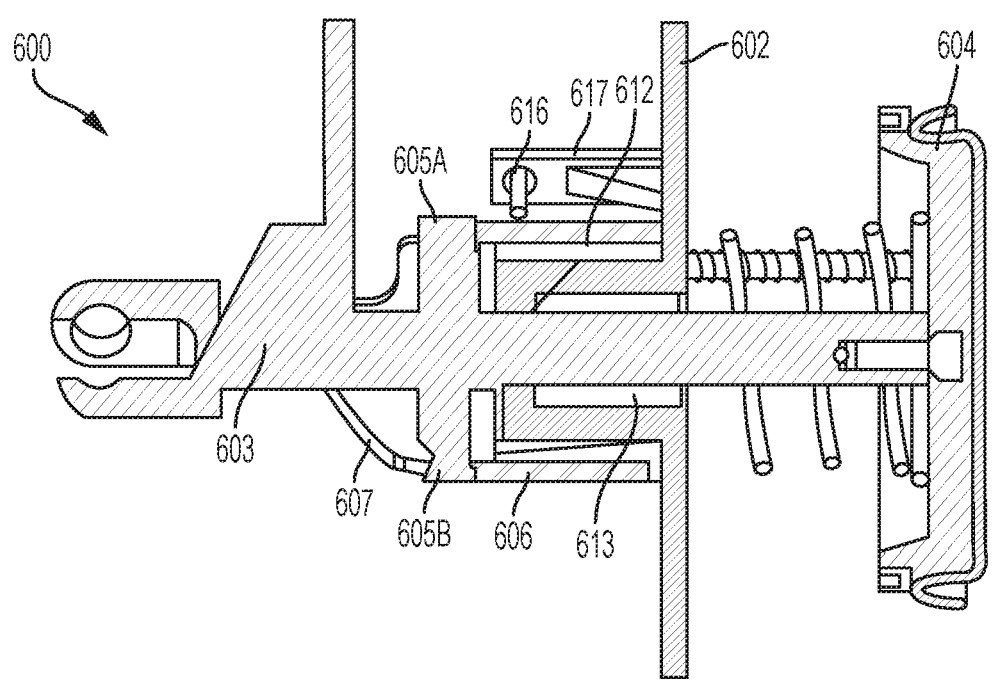
FIG. 21 is a cross-sectional view of the brake cylinder assembly along lines 21-21 shown in FIG. 20.

When a brake application is made, reduction of the fluid pressure in the brake pipe 8 causes, through a conventional transfer valve 9 shown in FIGS. 11 and 12, pressurization of the brake actuator 70 which results in movement of the brake actuator piston mounted within the housing thereof. This movement of the piston causes a spring, also mounted within the housing of the brake cylinder assembly, to compress, resulting in movement of a push rod 30, which is attached to the force transfer lever 24, in a first direction to effect counterclockwise rotation of the force-transfer lever 24. The force-transfer lever 24 in turn actuates the slack adjuster assembly 28 to effect counterclockwise rotation of the force-transfer lever 26 and consequent actuation of the return push rod assembly 32.

The force-transfer levers 24 and 26, along with the slack adjuster assembly 28, the return push rod assembly 32, and the brake actuator 70 comprise a brake beam actuating linkage that interconnects the brake beams 12 and 13 via pivot pins 27 and, thus, the required brake actuation forces effectively act along these pins 27. The resultant of these forces is shown at X in FIG. 3. Since the length of the slack adjuster assembly 28 increases with actuation of the brake actuator piston rod, it follows that brake beams 12 and 13 are moved apart by the brake beam linkage until the brake shoe engagement with the tread surface of the vehicle wheels 4a occurs. When the fluid pressure is evacuated from the brake actuator 70 due to the reduction of the fluid pressure in the brake pipe 8 and operation of the transfer valve 9, the push rod 30 moves in an opposed second direction, causing the brake rigging 10 to release the brakes.

During a parking situation when the railway cars 2 are taken out of the railway vehicle and parked, for example, at a siding or yard, the pneumatic braking system, as described above, can no longer be used. Thus, in order to apply the brake as a precaution against unwanted or unexpected movement of the cars, a hand brake mechanism, which is mounted on each car, can be employed.

In FIG. 1, a known, exemplary hand brake mechanism, generally designated as 40, is shown. The hand brake mechanism 40 has a housing, generally designated as 42, which comprises a back plate or wall 44, mountable on a railway car 2, and a cover 46 which is secured to the back wall 44. A chain 48, for application or release of the brakes, is connected, as is conventional, to the brake rigging 10 via a hand brake lever 50 and wound on a winding drum 52. The hand brake lever 50 is, in turn, connected to the brake actuator transfer lever or force transfer lever 24.

In order to apply the brakes, a hand wheel 54 is rotated in a clockwise direction, as viewed in FIG. 1, to wind the chain 48 about the winding drum 52 and to cause the hand brake lever 50 to be pulled in an outward direction away from the brake rigging 10. This movement causes the force transfer lever 24 to be rotated in a counterclockwise direction, resulting in the push rod 30 being pulled in an outward direction and the required force being applied to the slack adjuster assembly 28. This applied force is similar to the force which is applied by the brake actuator push rod 30 of the brake actuator 70 when such is pressurized. However, it has been found that operators may improperly apply the brakes or forget to apply brakes via the hand brake 40, causing unwanted movement of the railway car 2. Furthermore, application and release of the brakes via the hand brake 40 increases operating costs of the railway car 2 due to labor associated with operation of the hand brake 40. Additionally, unintentional and undesirable ruptures or disconnects within the brake pipe 8 or brake hose (not shown) can prevent operation of the brake rigging 10.

Now with reference to FIGS. 2-11, a known, exemplary parking brake assembly, generally designated as 60, is shown and includes the brake actuator 70, which has a housing 72 mounted on the first brake beam 12 adjacent the pivotal connection of the first transfer lever 24. The housing 72 has a first end 73 and an opposed second end 74. The first end 73 is provided with mounting member 73a for stationarily securing the brake actuator 70 onto the beam 12. As is conventional, the first end 73 of the housing 72 is closed, while the second end 74 is generally open. A fluid-pressure-operable piston assembly 80 is mounted for a longitudinal reciprocal motion within the housing 72. The piston assembly 80 divides the housing 72 into a pressurized portion 75a disposed intermediate the first end 73 of the housing 72 and the first end 82 of the piston 80 and a non-pressurized portion 75b disposed adjacent the second end 74 thereof. A piston rod 90 is secured at a first end 92 thereof to a second end 84 of the piston assembly 80. The piston rod 90 is capable of extending through the axial opening 76 in the second end 74 of the housing 72 responsive to the supply of fluid pressure into the pressurized portion 75a. The piston rod 90 is secured at a second end 94 thereof to a first end of the push rod 30, whereby the piston rod 90 and the piston assembly 80 move with the push rod 30 in the first and second directions.

Thus, in response to the supply of fluid pressure into the pressurized portion 75a of the housing 72, the piston assembly 80 moves in the first direction toward the second end 74 of the housing 72, causing the piston rod 90 and the push rod 30 to move in such first direction for increasing the length of the first force-transmitting means, to accordingly increase the spaced-apart distance between the first and second brake beams 12 and 13, respectively, in order to apply a braking force.

A spring member 100 is disposed in the non-pressurized portion 75b of the housing 72 and is caged between an inner surface 77 of the second end 74 of the housing 72 and the second end 84 of the piston assembly 80. The spring member 100 is capable of exerting a force against the piston assembly 80 upon release of the spring member 100 responsive to evacuation of the fluid pressure from the pressurized portion 75a of the housing 72, causing longitudinal movement of the piston assembly 80 in the second direction within the housing 72 to accordingly retract the piston rod 90 therein. Accordingly, the push rod 30 will also move in the second direction and release the applied braking force.

A fluid communication means or device 102, including a conventional air pressure inlet 104, is also provided in fluid communication with the pressurized portion 75a of the housing 72 and with the brake pipe 8 for supplying the fluid pressure to the parking brake actuator 70 during brake application of the railway vehicle brake rigging 10, resulting in the longitudinal movement of the piston assembly 80 and the piston rod 90 in the first direction and in compression of the spring member 100. The fluid communication means or device 102 also is provided for evacuating the fluid pressure from the pressurized portion 75a of the housing 72 during brake release, resulting in the longitudinal movement of the piston assembly 80 and the piston rod 90 in the second direction due to the force exerted by the released spring member 100.

The parking brake assembly 60 further includes a clamping means or device, generally designated as 110, which is provided for maintaining the extended position of the push rod 30 during reduction of the fluid pressure in the brake pipe 8 to a predetermined level and for releasing the push rod 30 to move in the second direction due to the increase of the fluid pressure in the brake pipe 8 above such predetermined level.

In accordance with an example, such clamping device 110 includes a first elongated thread 112 formed on at least a portion of the exterior surface of the piston rod 90 movable through the non-pressurized portion 75b of the housing 72. A ratchet 114 is mounted within the non-pressurized portion 75b of the housing 72 for rotation about a longitudinal axis of the piston rod 90. A pair of optional bearings 115 may be provided for facilitating rotation of the ratchet 114. An aperture 116 is axially formed through the ratchet 114. A second thread 118 is formed on a surface of the axial aperture 116 for operable engagement with the first thread 112. There is a shaft 120 which is mounted for rotation in a spaced relationship with the ratchet 114. The rotational axis of the shaft 120 is substantially parallel to a rotational axis of the ratchet 114. The shaft 120 has a first end 122 thereof disposed within the non-pressurized portion 75b of the housing 72 and has a second end 124 thereof extending through an aperture 126 formed through the second end 74 of the housing 72 past an outer surface thereof. Finally, a holding pawl 128 is disposed within the non-pressurized portion 75b of the housing 72 and is secured to the shaft 120 for rotation therewith. The holding pawl 128 is rotatable in a first rotational direction for engagement with the ratchet teeth when a first rotational force is applied to the second end 124 of the shaft 120 due to the fluid pressure in the brake pipe 8 being reduced to a predetermined level. This engagement prevents movement of the push rod 30 in the second direction. The holding pawl 128 is rotatable in a second rotational direction for disengaging the ratchet teeth and permitting the push rod 30 to move in the second direction when a second rotational force is applied to at least one of the shaft 120 and the holding pawl 128 due to the increase of the fluid pressure in the brake pipe 8.

To mount the clamping device 110, the second end 74 of the housing 72 is formed by the first member 74a carrying the outer surface thereon and a second member 74b secured in spaced relationship with the first member 74a and wherein the ratchet 114 and the holding pawl 128 are mounted intermediate the first and the second members 74a and 74b. The first and the second members 74a and 74b are bolted to a flange 72a of the housing 72 in a conventional manner.

The rotational force may be applied to the second end 124 of the shaft 120 manually, for example with a gripping type tool or a wrench (not shown), and preferably, an operating lever 130 is provided and has a first end 132 thereof disposed on and secured to the second end 124 of the shaft 120 for rotation therewith. Thus, the operating lever 130 is rotatable in the first rotational direction when the first rotational force is applied to a second end 134 thereof and is rotatable in the second rotational direction when the second rotational force is applied to the second end 134 thereof.

It is further contemplated to provide an operating means or device, generally designated as 140, which is responsive to a fluid pressure condition within the brake pipe 8 for selectively and automatically operating the clamping device 110 to maintain the push rod 30, after its movement in the first direction, in the position for applying brakes and to release the push rod 30 for movement in the second direction.

Figure 7:
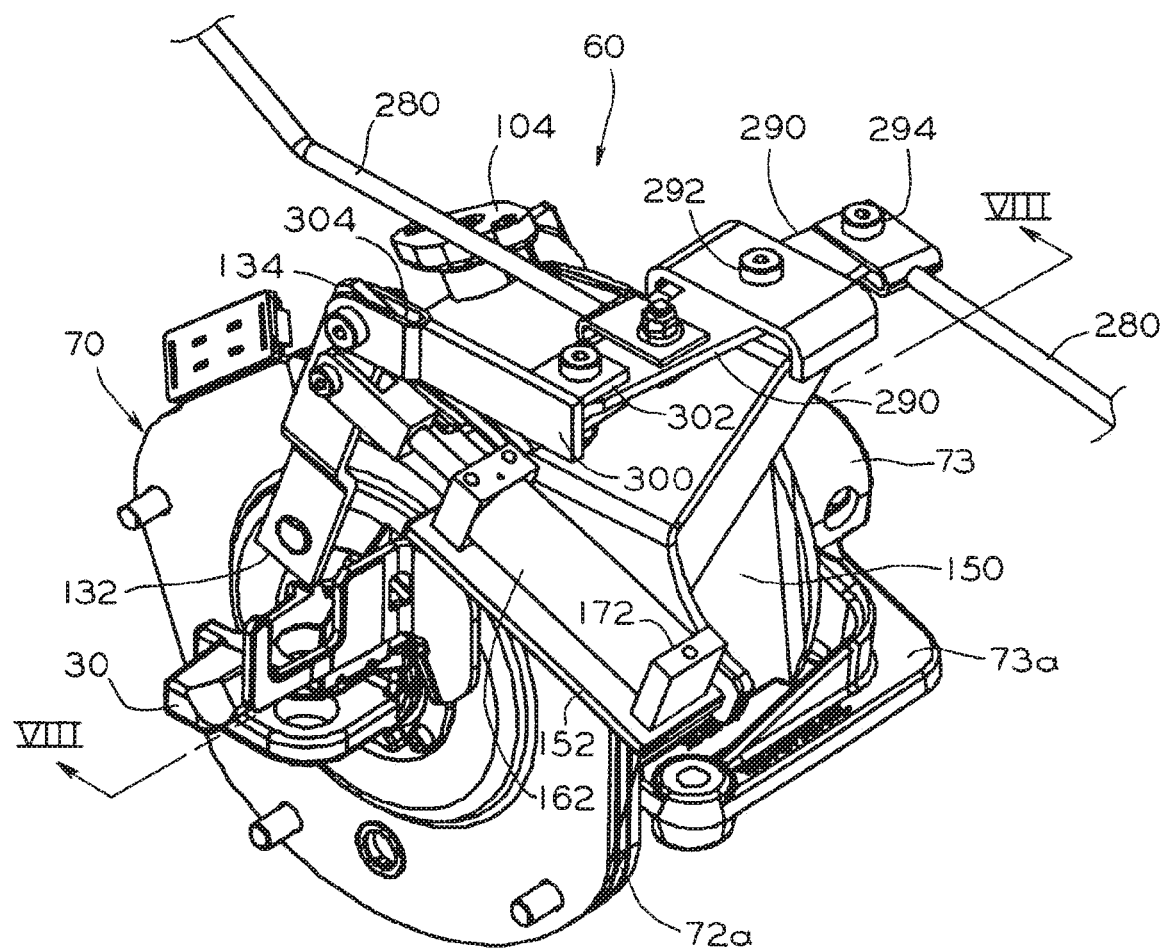
FIG. 7 is an enlarged perspective view of a brake actuator employed within the parking brake assembly.

Now with specific reference to FIGS. 7 and 11, such operating device 140 includes a mounting bracket 150 which is affixed to the outer surface of the second end 74 of the housing 72, preferably using the fasteners that attach the first and second members 74a and 74b, respectively, to the flange 72a. Thus, when installed, the mounting bracket 150 is disposed in a generally vertical plane. The mounting bracket 150 may be provided with a ledge portion 152, which is disposed generally horizontally.

A pneumatically operated cylinder, generally designated as 160, is provided and is mounted on the ledge portion 152 of the mounting bracket 150. The pneumatically operated cylinder 160 has a casing 162, a piston assembly 164 mounted for a longitudinal movement within the casing, a piston rod 166 connected at a first end thereof to a first end of the piston assembly 164 and pivotally connected at a second end thereof to the second end 134 of the operating lever 130, and a spring 168 which is caged within the casing 162 between an end thereof and the second end of the piston assembly 164. When installed within the railway car 2, the piston assembly 164 and piston rod 166 move in a direction which is generally perpendicular to the movement direction of the piston assembly 80, piston rod 90, and push rod 30, as well as to the rotational axis of the ratchet 114 and the holding pawl 128.

A fluid communication means or device 170, including a conventional fluid port 172, is provided in fluid communication with a second end of the piston assembly 164 and with the brake pipe 8 for supplying the fluid pressure to a second end of the piston assembly 164, causing the piston rod 166 to move outwardly and apply the second rotational force. Furthermore, the second fluid communication device is provided for evacuating the fluid pressure from the second end of the piston assembly 164 when the fluid pressure in the brake pipe 8 is reduced below the predetermined level, causing the spring 168 to extend and retract the piston rod 166 into the casing 162, thus applying the first rotational force to the second end 134 of the lever 130.

In normal operation, when the railway car 2 is in motion and/or when the fluid pressure in the brake pipe 8 is at its maximum, generally about ninety (90) pounds per square inch (PSI), the spring member 100 of the parking brake actuator 70 is extended and brakes are released. Consequently, the fluid pressure from the brake pipe 8 is supplied to the pneumatically operated cylinder 160, causing the piston rod 166 to apply a second rotational force to the operating lever 130, thus preventing the holding pawl 128 from engaging the ratchet 114.

When a partial brake application (10 PSI reduction from maximum in the brake pipe fluid pressure) or a full service brake application (25 PSI reduction in the brake pipe fluid pressure from maximum) is commanded from the locomotive (not shown), the fluid pressure is supplied to the pressurized portion 75a of the housing 72, causing the piston assembly 80 to move in the first direction toward the second end 74 of the housing 72 and against the resistance of the spring member 100 and, more particularly, causing the piston rod 90 and the push rod 30 to move in such first direction and apply brakes. When a brake release is commanded and the fluid pressure in the brake pipe 8 begins to rise, the fluid pressure is evacuated from the pressurized portion 75a of the housing 72 though the directional or transfer valve 9, causing the spring member 100 to extend, moving the push rod 30 in the second direction, and releasing the brake force. As long as the fluid pressure in the brake pipe 8 is above the predetermined level, the piston rod 166 continues to apply the second rotational force to the operating lever 130, thus preventing the holding pawl 128 from engaging ratchet teeth.

When the fluid pressure in the brake pipe 8 reduces below the predetermined level, which is generally set below the level present in full service brake application, the fluid pressure is evacuated from the pneumatically operated cylinder 160, causing the spring 168 to extend and retract the piston rod 166 into the casing 162, thus applying the first rotational force to the second end 134 of the lever 130 and engaging the holding pawl 128 with the ratchet 114. Since the brake actuator 70 will operate as described above to move the push rod 30 in the first direction to apply braking force, the engagement of the holding pawl 128 with the ratchet 114 will maintain the push rod 30 in such brake-applied condition. Advantageously, the ratchet teeth are formed so that the ratchet 114 rotates to allow movement of the push rod 30 in the first direction even when the holding pawl 128 engages the ratchet 114 prior to the push rod 30, completing its movement to apply brakes.

When the supply of the fluid pressure to the cylinder 160 is restored, the piston rod 166 will move outwardly from the housing 162 and apply a second rotational force to the operating lever 130, thus disengaging the holding pawl 128 from engagement with ratchet 114. The predetermined fluid pressure level in the brake pipe 8 at which the holding pawl 128 engages the ratchet 114 is also dependent on the rate of the spring 168 as well as on specific application requirements. For example, it may be desirable for the holding pawl 128 to engage the ratchet 114 only during a rapid fluid pressure decrease that is commonly known as an emergency brake application when the fluid pressure in the brake pipe reduces to about 10 PSI and then further to 0 PSI.

It is also within the scope of the example to evacuate fluid pressure from and re-supply it to the pneumatically operated cylinder 160 at different pressure levels within the brake pipe 8. By way of an example only, it may be advantageous to begin disengaging the holding pawl 128 from engagement with the ratchet 114 when the fluid pressure in the brake pipe is increased to about 25 PSI.

While the above-described operation provides for automatic application and release of the brakes, it is also possible to provide a manually operable release means or device, generally designated as 200, which is coupled to the pneumatically operated cylinder 160 for manually releasing the push rod 30 to move in the second direction. According to one example, such manually operable release device 200 includes a release shaft 202 in secured threaded engagement to the casing 162 of the pneumatically operated cylinder 160. The release shaft 202 has a first end thereof coaxially secured to the second end of the piston 164 and having a second end thereof extending outwardly from the casing 162, whereby selective manual rotation of the second end of the release shaft 202 causes extension or retraction of the piston rod 166, rotating the operating lever 130 in the first or second rotational directions.

According to another example, the manually operable release device 200 includes a valve 210, best illustrated in FIG. 12, which is disposed within the fluid communication means or device 170 intermediate the brake pipe 8 and the pneumatically operated cylinder 160. The valve 210 is operable in a first position for supplying the fluid pressure to the pneumatically operated cylinder 160 when the fluid pressure in the brake pipe 8 is maintained above the predetermined level. In this position, the fluid pressure compresses an extension spring 212 mounted within the valve 210, allowing the fluid pressure to flow through to the pneumatically operated cylinder 160. The valve 210 is also operable in a second position to discontinue, due to release of the compressed spring 212, supply of the fluid pressure to the pneumatically operated cylinder 160 and exhaust the fluid pressure from the pneumatically operated cylinder 160 to atmosphere. When the fluid pressure decreases below the predetermined set level, the spring 212 extends and blocks the flow of the fluid pressure through the valve 210 and opens passage to its exhaust port.

The valve 210 also includes a manually operable means or device, such as a pushbutton 214 disposed therein, for manually restoring the supply of the fluid pressure to the pneumatically operated cylinder 160. Manual actuation of the pushbutton 214 briefly compresses the spring 212 to allow the flow of the fluid pressure through the valve 210, which will keep the spring 212 in a compressed condition when the pushbutton 214 is released.

A pair of valves 210 may be provided, each installed adjacent a respective end of the railway car 2 to reduce the labor of releasing the applied parking brake assembly 60 by eliminating the operator of the railway car 2 to walk to the end on which the parking brake assembly 60 is installed.

According to yet another example, the manually operable release means or device 200 may include a two-position, three-port valve 220, best shown in FIG. 11. An auxiliary reservoir 222 of the fluid pressure may be connected at one port thereof to the brake pipe 8 through a check valve 224 and a restricting choke 226 mounted in series with the check valve 224 and connected at another port thereof to the valve 220.

It is also within the scope of the example to provide other means or devices for operating the valve 210 or 220 to restore the fluid pressure to the pneumatically operated cylinder 160. By way of an example shown in FIG. 12, a three-way valve 230 may be provided, wherein the pushbutton 214 has been replaced with a solenoid 232 so that the valve 210 can be operable in the second position for allowing flow of the fluid pressure therethrough by an electrical signal which can be remotely transmitted, for example from the locomotive (not shown), by any well-known methods including wires, radio frequency, satellite communicating, and like methods. This example allows remote release of the applied parking brake assembly 60. Advantageously, the valve 230 may be adapted with a second solenoid 234 to remotely operate such valve 230 into the position for enabling flow of the fluid pressure to the cylinder 160 and, more particularly, allowing remote application of the parking brake assembly 60.

The example also contemplates to provide either valve 210, 220, or 230 in combination with the release shaft 202 of FIG. 11. For example, a manually operable valve 210 or 220 is mounted in close proximity to the end or the side of the railway car 2 enabling the operator of the railway car 2 to safely and conveniently operate the parking brake assembly 60 from one side of the railway car 2 without the need to reach underneath thereof and into the confines of the truck apparatus 3. It will be appreciated that the above-described manual release means or devices 200 are of a pneumatic type. It is also possible to provide the manual release devices as mechanical type devices which do not depend on presence or absence of the fluid pressure in the brake pipe 8 to release applied brakes. Such a mechanical manual release device, generally designated as 250, is described herein in combination with the brake rigging 10 installed within the truck apparatus 3 carrying one end of the railway vehicle body. As was described above, such truck apparatus 3 includes the frame 5 having the pair of side members 6a and 6b joined by the bolster 7.

Now with specific reference to FIGS. 2-7, the manual release means or mechanism 250 includes a first plate-like member 252 in abutted engagement to an inner vertical surface portion of one side member, shown as 6a, of the truck apparatus 3. A first plurality of apertures 254 are formed through the first plate-like member 252 and are disposed in a predetermined pattern. A second plate-like member 256 is in abutted engagement to an outer vertical surface portion of the side member 6a. A second plurality of apertures 254 are formed through the second plate-like member 256 and are disposed in the same predetermined pattern as the apertures 254 formed through the first plate-like member 252. Each of the second plurality of apertures 254 is aligned with a respective one of the first plurality of apertures 254. There is a plurality of rods 260 provided with each of the passed-through aligned apertures 254 in the first and second plate-like members, 252 and 256 respectively. A male thread 262 is formed on each end of each rod 260. A plurality of threaded fasteners 264 is used, with each fastener 264 operably engaging a respective rod end for affixing the first and second plate-like members, 252 and 256 respectively, about the side member 6a by caging a portion thereof between these plate-like members.

Further, an elongated slot 270 is formed though a first plate-like member 252 and extends in a generally horizontal direction. An L-shaped slot 272 is formed in the second plate-like member 256 and has a horizontal leg 274 thereof aligned with the elongated slot 270 formed through the first plate-like member 252. The L-shaped slot 272 also has a vertical leg 276.

An elongated link member 280 is provided and has a predetermined shape for routing through the truck apparatus 3. The first end 282 of the link member 280 passes through the elongated slot 270 and through the L-shaped slot 272 and extends outwardly from the second plate-like member 256. There is also a mechanical arrangement for connecting a second end 284 of the link member 280 to the parking brake assembly 60. A grip member 286 is disposed on and secured to the first end 282 of the elongated link member 280. This grip member 286 is manually operable to move the link member 280 from a first position enabling application of the parking brake assembly 60 into a second position enabling release of an applied parking brake assembly 60. The grip member 286 may be shaped as a conventional handle and may be further provided integral with the link member 280 by bending the second end 284 thereof. A biasing means or element is provided and is engaged with the elongated link member 280 for returning the link member 280 into the first position upon release of the grip member 286.

The mechanical arrangement for connecting the second end 284 of the elongated link member 280 to the parking brake assembly 60 includes first release lever 290 which is pivotally connected to the mounting bracket 150. By way of an example shown in FIGS. 6 and 7, such pivotal connection may be achieved with a pin or fastener 292 passed through aligned apertures (not shown) in the first release lever 290 and the mounting bracket 150. There is also pivotal connection pivotally connecting the second end 284 of the elongated link 280 to one end of the first release lever 290. By way of an example shown in FIGS. 6 and 7, such second end 284 may be formed as a bifurcated portion with an aperture (not shown) formed therethrough and aligned with another aperture (not shown) formed through the first release lever 290, and wherein a pin or fastener 294 passes through these aligned apertures (not shown). There is also a second release lever 300 having a first end 302 thereof pivotally connected to a second end of the first release lever 290 and having a second end 304 thereof pivotally connected to the second end 134 of the operating lever 130.

In operation, manually initiated movement of the elongated link 280 from the first position toward the second position causes rotational movement of the operating lever 130 in the second rotational direction due to rotation of each of the first and second release levers, 290 and 300 respectively, thus enabling the holding pawl 128 to disengage the ratchet teeth and enable the push rod 30 to move in the second direction due to extension of the spring 100, thus releasing the applied braking force. During manual release of the brakes, the grip member 286 is movable through a vertical leg 276 of the L-shaped slot 272 and, accordingly, the manual release mechanism 250 includes a pair of spacers 258 rigidly secured to an inner surface of the second plate-like member 256 for positioning it in a spaced relationship with the outer surface of the side member 6a and for enabling movement of the grip member 286 through the vertical leg 276 of the L-shaped slot 272. The employment of the horizontally disposed leg 274 enables the operator of the railway car 2 to move the grip member 286 through the vertical leg 276 sufficiently to clear the outer surface of the second plate-like member 256 and then move the grip member 286 laterally along the first leg 274 to latch such grip member 286 against the outer surface of the second plate-like member 256 to prevent the elongated link 280 from returning into the first position and, more particularly, prevent the holding pawl 128 from reengaging the ratchet 114. Thus, the railway car 2 can be freely moved. When required, the user laterally moves the grip member 286 in the opposite direction so it can move through the vertical leg 276, thus allowing the link member 280 to return into the first position due to the action of the biasing means. It is also possible to angle the leg 274 downwardly in order to facilitate retention of the grip member 286.

With particular reference to FIG. 7, the biasing means or device may be formed by a first washer 310 movably secured to the elongated link member 280, a second washer 312 rigidly secured to the elongated link member 280 in spaced relationship with the first washer 310, and a spring 314 caged between the first washer 310 and the second washer 312. It will be appreciated that the spring 314 will be compressed during movement of the elongated link member 280 into the second position and will extend when the manual movement is discontinued and when the link member 280 is unlatched, thus returning it into the first position. The manual release mechanism 250 enables the operator of the railway car 2 to safely and conveniently release the applied parking brake assembly 60 from one side of the railway car 2 without the need to reach underneath thereof and into the confines of the truck apparatus 3. It is further possible to provide a second manual release mechanism 250 operable from the other side of the railway car 2 as best shown in FIGS. 2-4 and 7.

Figure 13:
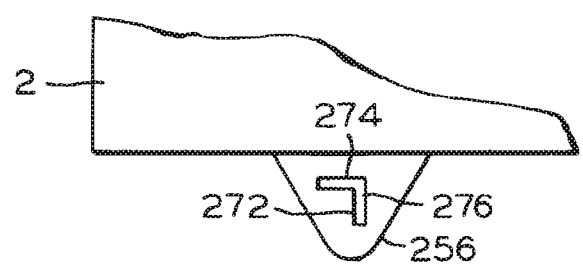
FIG. 13 is a side view of a mechanically operated manual release assembly, illustrated in FIG. 6, and connected to the side of the railway car body shown in FIG. 3.

Although the manual release mechanism 250 has been shown and described in terms of the parking brake assembly 60 being used with a truck-mounted brake system, it will be apparent to those skilled in the art that the manual release mechanism 250 may be applied with the parking brake assembly being used with a car body mounted brake system by simply securing the second plate-like member 256 to the side of the railway car body and simply connecting the first end 282 of the elongated member 280 to the second plate-like member 256, as depicted in FIG. 13.

Figure 8:
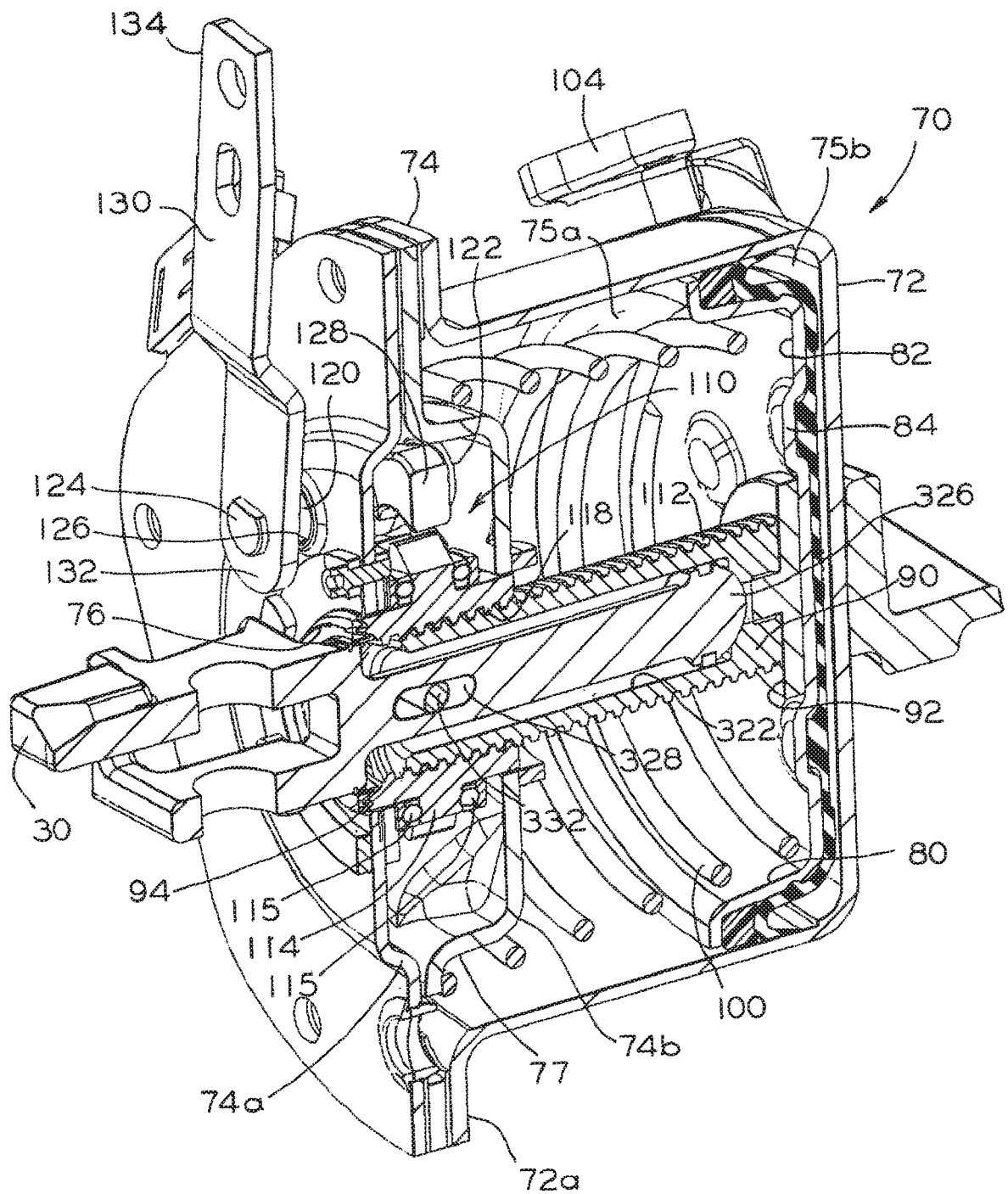
FIG. 8 is a cross-sectional view of the brake actuator taken along lines VIII-VIII in FIG. 7.
Figure 9:
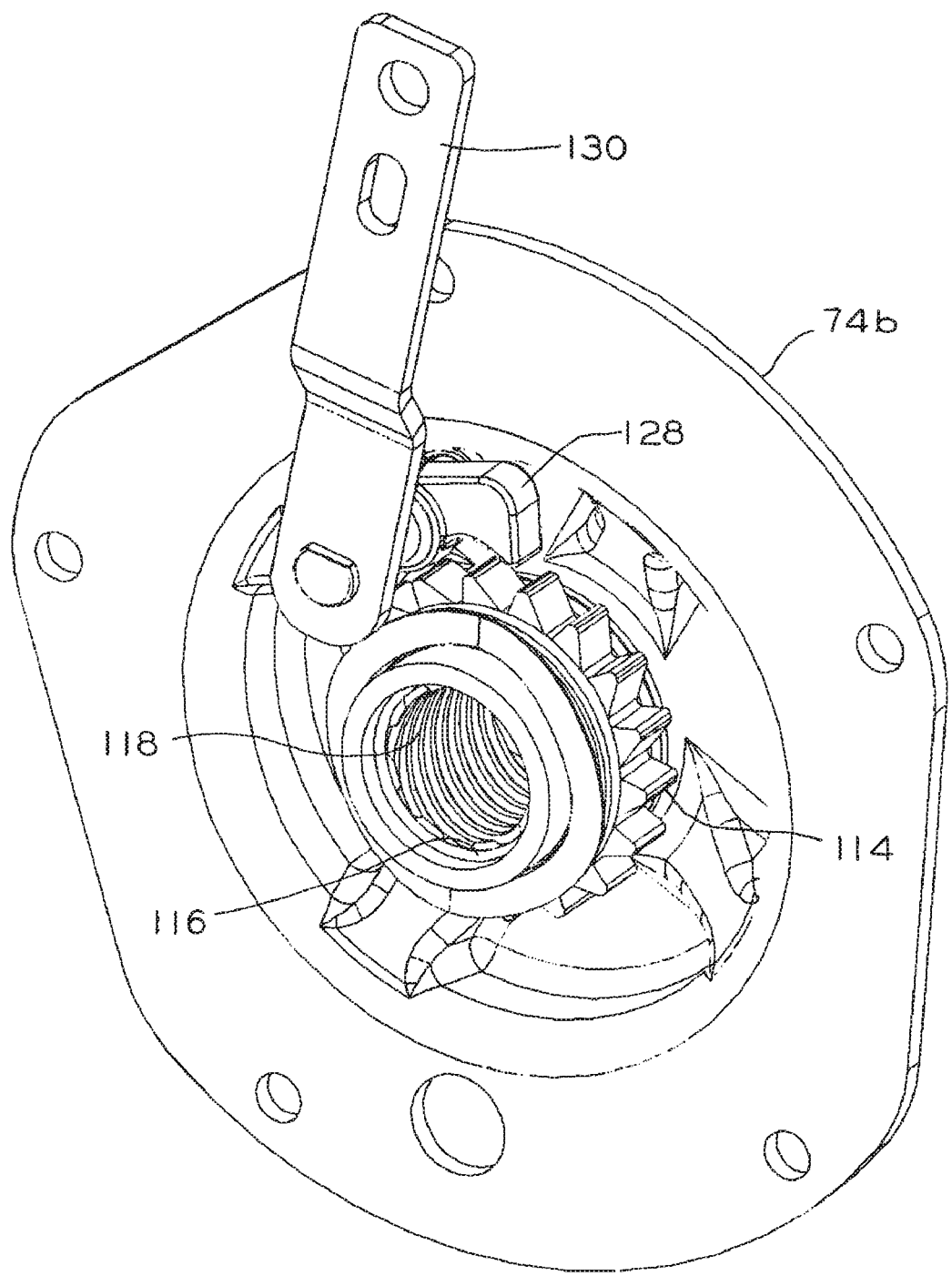
FIG. 9 is a partial perspective view of the brake actuator of FIG. 7.
Figure 10:
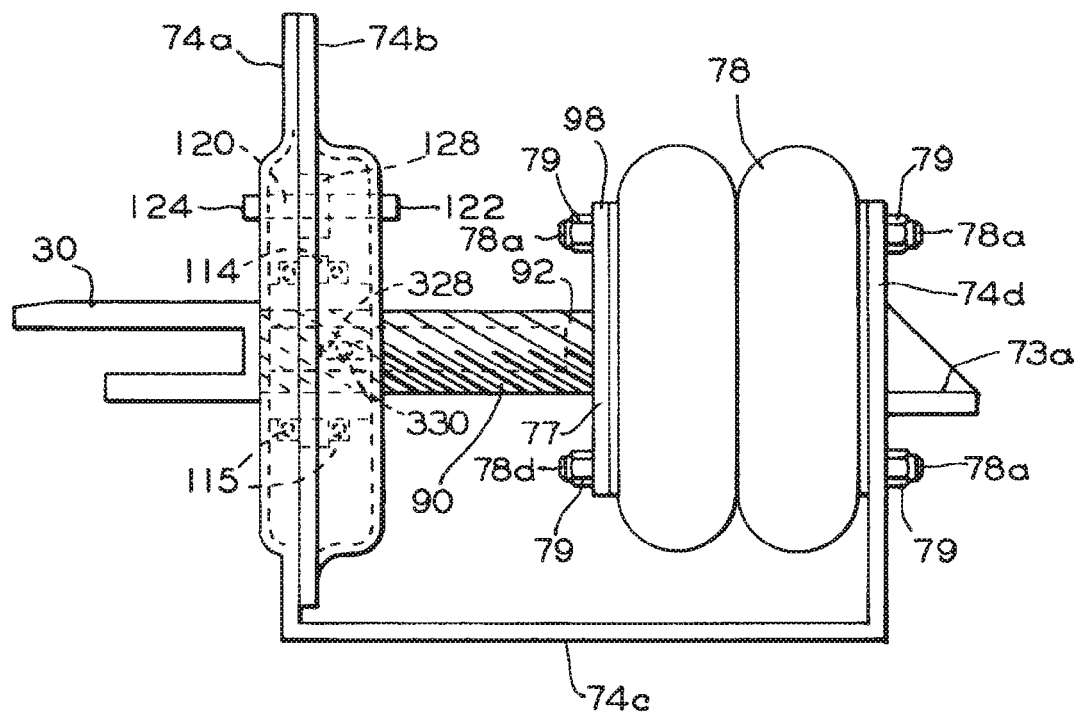
FIG. 10 is a side view of the brake actuator employed within a parking brake assembly.

According to one example, means for compensating for bail of the push rod 30 moving laterally during the rotation of the force-transfer lever 24 and, at the same time, preventing rotation of the piston rod 90 during longitudinal movement may be provided. With reference to FIGS. 8 and 10, such means include an axial cavity 322 formed within the piston rod 90 and defining a peripheral wall of the piston rod 90. An aperture is formed through the peripheral wall. An elongated abutment 326 is disposed on and secured to the push rod 30 and is positioned within the axial cavity 322. A slot 328 is formed through the abutment 326 in alignment with the aperture 330 formed through the peripheral wall of the piston rod 90. An elongated pin 332 is frictionally passed through a combination of the slot 328 and the aperture 330 formed through the peripheral wall of the piston rod 90 allowing for axial movement of the push rod 30 while preventing rotational movement of the piston rod 90.

The example also contemplates to provide means for compensating for bail of the push rod 30 moving laterally during the rotation of the force-transfer lever 24 and, at the same time, prevent rotation of the piston rod 90 during longitudinal movement. Now in reference to FIG. 8, such means includes an axial cavity 322 formed within the piston rod 90 and defining a peripheral wall of the piston rod 90. An aperture is formed through the peripheral wall. An elongated abutment 326 is disposed on and secured to the push rod 30 and is positioned within the axial cavity 322. A slot 328 is formed through the abutment 326 in alignment with the aperture 330 formed through the peripheral wall of the piston rod 90. An elongated pin 332 is frictionally passed through a combination of the slot 328 and the aperture 330 formed through the peripheral wall of the piston rod 90, allowing for axial movement of the push rod 30 while preventing rotational movement of the piston rod 90.

With reference to FIGS. 14-23, specific examples of the present disclosure are provided and discussed below that are particularly suitable for use in connection with brake actuators of the type described above with reference to FIGS. 1-13 and in Applicant's U.S. Pat. No. 8,006,815, which is incorporated by reference in its entirety.

Introduction

According to the examples of the present disclosure described below, a mechanically activated extension cylinder 506, 606 for a brake actuator mechanism is provided. The extension cylinder 506, 606 includes one or more cam surfaces 508A, 508B, 608A, 608B that engage a piston rod 503, 603 of the brake actuator. The extension cylinder 506, 606 includes a lever or arm 512, 615 that is operatively connected to the railcar hand brake mechanism. The cam surface(s) 508A, 508B, 608A, 608B on the extension cylinder 506, 606 are helically arranged on a forward end 507, 607 of the extension cylinder 506, 606 to create a cam/screw mechanism that extends the piston rod 503, 603 of the brake actuator as the extension cylinder 506, 606 rotates to apply brake system force to the wheels of the railcar. The combination of the extension cylinder 506, 606, cam surface 508A, 508B, 608A, 608B, and lever arm 512, 615 allows for a wide range of lever ratios to be applied to the actuation of the piston rod 503, 603. According to certain examples of the disclosure, lever ratios of 1.5:1 to 9.0:1 can be achieved. It is to be appreciated that the extension cylinder 506, 606 of the examples described below is not limited to use with an externally mounted hand brake mechanism. The hand brake mechanism may also be integral with the brake actuator or the brake cylinder.

As discussed above, the extension cylinder according to the examples described below provides a lever ratio between the brake cylinder 500, 600 of the brake actuator and the hand brake mechanism. The extension cylinder 506, 606 according to the examples described below provide higher brake system forces using existing railcar structures. The extension cylinder 506, 606 can be used with a hand brake mechanism utilizing a hand wheel and chain, as described above with reference to FIGS. 1-13. When used with such a hand brake mechanism, the extension cylinder 506, 606 can potentially yield increased efficiency and higher lever ratios.

According to the examples of the present disclosure discussed below, certain terms, symbols, and abbreviations as used in this disclosure are defined as follows:

Single Diameter—describes the mean diameter of the cam/screw extension cylinder. There may be multiple screw leads or ramp surfaces, but they have the same mean diameter.

Double Diameter—describes the mean diameter of the cam/screw extension cylinder. There can be two different mean diameters of the cam/screw extension cylinder. Each mean diameter can have multiple screw leads or ramp surfaces.

Single Angle—describes the cam/screw profile of the extension cylinder. Single Angle refers to the screw lead angle or angle of the ramp surface of the cam profile of the extension cylinder.

Double Angle—describes the cam/screw profile of the extension cylinder. Double Angle refers to two ramp angles in a single ramp with a well-defined transition from one ramp angle to the next.

Lifter Lever Ratio—ratio dealing with only the translation component of the extension cylinder.

Lifter Screw Lever Ratio—ratio dealing with the rotational component of the extension cylinder.

Lifter Lever Arm—distance from a center of the extension cylinder to a center of the hand brake mechanism/extension cylinder connection.

Mean Diameter Ramp—average of inside and outside diameters of a cylindrical ramp.

$\pi$—3.14159 . . . .

$\mu_{ramp}$—coefficient of friction of cylindrical ramp.

Lead—translation per revolution.

Piston Stroke—defines translation direction.

Angle of Designed Rotation—portion of rotational stroke designed for maximum lever ratio.

Hand Brake System Stroke—available translation at a hand brake/cylinder connection.

According to the examples of the present disclosure discussed below, the extension cylinder is configured to actuate the piston rod to cause an application of the brake force to the railcar wheels in accordance with the following mathematical principles:

The Lifter Cylinder Lever Ratio is a combination of the lever arm used to attach a hand brake cable or chain to the extension cylinder and the cam/screw of the extension cylinder and is defined by equation one (1).

$$\text{Lifter Cylinder Lever Ratio} = \text{Lifter Lever Ratio} * \text{Lifter Screw Lever Ratio} \qquad (1)$$

Equation two (2) defines the Lifter Lever Ratio.

$$\text{Lifter Lever Ratio} = \frac{\text{Lifter Lever Arm}}{(\text{Mean Diameter Ramp})/2} \qquad (2)$$

Equations three (3), four (4), and five (5) define the Lifter Screw Lever Ratio. Equation (3) is a modification of the generic ACME screw equation. A reference to these equations can be found in Shigley and Mischke, MECHANICAL ENGINEERING DESIGN, 6$^{th}$ ed.

$$\text{Lifter Screw Lever Ratio} = \frac{\pi * \text{Mean Diameter} - \mu_{ramp} * l}{l + \pi * \mu_{ramp} * \text{Mean Diameter}} \qquad (3)$$

$$l = \text{lead}\left(\frac{\text{Stroke}}{\text{rev}}\right) = \frac{\text{Piston Stroke} * 360 \text{ degrees}}{\text{Angle of Designed Rotation}} \qquad (4)$$

$$\text{Angle of Designed Rotation} = f(\text{Lifter Lever Arm, Hand Brake System Stroke}) \qquad (5)$$

Equation one (1) is further complicated by both of the following series of equations.

Lifter Lever Ratio=$f$(Mean Diameter Ramp,Lifter Lever Arm)     (6)

Lifter Screw Lever Ratio=$f$(Mean Diameter Ramp,$\mu_{ramp}$, Piston Stroke, Lifter Lever Arm, Hand Brake System Stroke)     (7)

From a combination of equations six (6) and seven (7) the governing factor in design is the Hand Brake System Stroke. It is noteworthy that both equations six (6) and seven (7) share the variables Mean Diameter Ramp and Lifter Lever Arm making system analysis more complicated.

Single Ramp Angle/Single Diameter

With reference to FIGS. 14-17, a portion of a brake actuator for a brake rigging in a railway brake system is shown in accordance with an example of the present disclosure. The brake actuator includes a brake cylinder assembly 500, which includes a cylinder body 501. The cylinder body 501 includes a non-pressure head 502 at the front side thereof. The remaining features of the brake cylinder assembly 500 and cylinder body 501 are not shown in FIGS. 14-17, but it is to be appreciated that the brake cylinder assembly 500 and cylinder body 501 may be of a similar configuration as the brake cylinder discussed above with reference to FIGS. 1-13. The brake cylinder 500 further includes a piston rod 503 extensibly disposed on the brake cylinder 500/cylinder body 501 and operatively connected to a piston assembly 504. The piston rod 503 is configured to be moved by the piston assembly 504 in a reciprocal axial motion between extended and retracted positions with respect to the brake cylinder 500/cylinder body 501. The piston rod 503 includes at least one lateral protrusion 505A extending laterally therefrom. As shown, the piston rod 503 includes two lateral protrusions 505A, 505B extending therefrom in opposing lateral directions. The piston rod 503 is rotatably/slidably supported in the non-pressure head 502 of the brake cylinder 500/cylinder body 501 by a piston rod bearing 510 positioned in a central aperture of the non-pressure head 502.

An extension cylinder 506 is disposed on the brake cylinder 500 in a position surrounding or at least partially surrounding the piston rod 503. The extension cylinder 506 is rotatably supported on the non-pressure head 502 of the brake cylinder 500 by a lifter bearing 509 disposed between the extension cylinder 506 and the non-pressure head 502. The extension cylinder 506 includes at least one cam surface 508A defined on a forward end 507 thereof. As shown, the extension cylinder 506 includes two separate cam surfaces 508A, 508B on opposing circumferential sides of the extension cylinder 506. Each cam surface 508A, 508B is engaged by a respective lateral protrusion 505A, 505B in at least a sliding contact such that the lateral protrusion 505A, 505B is able to travel along the cam surface 508A, 508B of the extension cylinder 506 as the extension cylinder 506 is rotated. According to one particular example of the present disclosure, the lateral protrusions 505A, 505B each include a rotatable bearing 511 such that the lateral protrusions 505A, 505B are able to engage the respective cam surface 508A, 508B of the extension cylinder 506 in a rolling/sliding contact.

The extension cylinder 506 is configured to be operatively connected to a hand brake mechanism (not shown) and to be actuated by the hand brake mechanism to rotate. In particular, the extension cylinder 506 may also include a lever or lifter lever arm 512 extending laterally therefrom that is configured to be engaged by a hand brake mechanism (not shown), which may be of the type described above with reference to FIGS. 1-13. According to one example of the present disclosure, the lever arm 512 is formed integrally with the extension cylinder 506. The extension cylinder 506 is configured to be actuated via the lever 506 to rotate such that the cam surfaces 508A, 508B engage the lateral protrusions 505A, 505B of the piston rod 503 to cause the piston rod 503 to move from the retracted position to the extended position.

As shown in FIGS. 14-17, each cam surface 508A, 508B of the extension cylinder 506 includes a ramp surface extending at a single ramp angle and has a single mean diameter D from the center of the extension cylinder 506.

According to the example shown in FIGS. 14-17, the extension cylinder 506 allows for the application of a high lever ratio to the piston rod 503 in a configuration compatible with a standard wheel-type hand brake mechanism. The lever 512 of the extension cylinder 506 has a swing of approximately 90°. To that end, a lever stop 513 may be provided on the non-pressure head 502 that extends to engage the lever 512 at the end of its rotational swing to prevent or limit over rotation of the extension cylinder 506. According to this example, the extension cylinder 506 is most effective when no limits are imposed on the degree of system rotation. The wheel-type hand brake mechanism is configured to deliver unlimited translation to the connection between the hand brake mechanism and the extension cylinder 506. The translation of the connection is constrained to the effective rotational envelope of the brake cylinder/car body/bogie. The lever 512 of the extension cylinder 506 according to this example has a comparatively large length to gain the greatest lever ratio, as detailed in equations (1)-(7) provided above.

Additionally, as an alternative to the lever stop 513 discussed above, the extension cylinder 506 may incorporate a positive return stop that returns the extension cylinder 506 to a starting position with respect to the piston rod 503 when the hand brake mechanism is released, as will be discussed further below with reference to the example of FIGS. 18-21.

Double Angle Single Ramp

With reference to FIGS. 18-21, a portion of a brake actuator for a brake rigging in a railway brake system is shown in accordance with an example of the present disclosure. The brake actuator includes a brake cylinder assembly 600, which includes a cylinder body 601. The cylinder body 601 includes a non-pressure head 602 at the front side thereof. The remaining features of the brake cylinder assembly 600 and cylinder body 601 are not shown in FIGS. 18-21, but it is to be appreciated that the brake cylinder assembly 600 and cylinder body 601 may be of a similar configuration as the brake cylinder discussed above with reference to FIGS. 1-13. The brake cylinder assembly 600 further includes a piston rod 603 extensibly disposed on the brake cylinder 600/cylinder body 601 and operatively connected to a piston assembly 604. The piston rod 603 is configured to be moved by the piston assembly 604 in a reciprocal axial motion between extended and retracted positions with respect to the brake cylinder 600/cylinder body 601. The piston rod 603 includes at least one lateral protrusion 605A extending laterally therefrom. As shown, the piston rod 603 includes two lateral protrusions 605A, 605B extending therefrom in opposing lateral directions. The piston rod 603 is rotatably/slidably supported in the non-pressure head 602 of the cylinder body 601 by a piston rod bearing 613 positioned in a central aperture of the non-pressure head 602.

An extension cylinder 606 is disposed on the brake cylinder 600/cylinder body 601 in a position surrounding or at least partially surrounding the piston rod 603. The extension cylinder 606 is rotatably supported on the non-pressure head 602 of the cylinder body 601 by a lifter bearing 612 disposed between the extension cylinder 606 and the non-pressure head 602. The extension cylinder 606 includes at least one cam surface 608A defined on a forward end 607 thereof. As shown, the extension cylinder 606 includes two separate cam surfaces 608A, 608B on opposing circumferential sides of the extension cylinder 606. Each cam surface 608A, 608B is engaged by a respective lateral protrusion 605A, 605B in at least a sliding contact such that the lateral protrusion 605A, 605B is able to travel along the cam surface 608A, 608B of the extension cylinder 606 as the extension cylinder 606 is rotated. According to one particular example of the present disclosure, the lateral protrusions 605A, 605B may each include a rotatable bearing, such as the rotatable bearing 511 described above with reference to FIGS. 14-17, such that the lateral protrusions 605A, 605B are able to engage the cam surfaces 608A, 608B of the extension cylinder 606 in a rolling/sliding contact.

The extension cylinder 606 is configured to be operatively connected to a hand brake mechanism (not shown) and to be actuated by the hand brake mechanism to rotate. In particular, the extension cylinder 606 may also include a lever or lifter lever arm 615 extending laterally therefrom that is configured to be engaged by a hand brake mechanism (not shown), which may be of the type described above with reference to FIGS. 1-13. In particular, the hand brake mechanism includes a cable 616 that connects the lifter lever arm 615 to the hand brake mechanism. A cable guide 617 may be provided on the non-pressure head 602 to guide and support the cable 616 on the brake cylinder 600. According to one example of the present disclosure, the lifter lever arm 615 is formed integrally with the extension cylinder 606. The extension cylinder 606 is configured to be actuated via the lifter lever arm 615 to rotate such that the cam surfaces 608A, 608B engage the lateral protrusions 605A, 605B of the piston rod 603 to cause the piston rod 603 to move from the retracted position to the extended position.

The extension cylinder 606 and the non-pressure head 602 of the brake cylinder 600 also include a positive return stop 614 that returns the extension cylinder 606 to a starting position with respect to the piston rod 603 when the hand brake mechanism is released. The positive return stop 614 according to this example controls the starting position of the cam surfaces 608A, 608B of the extension cylinder 606 each time the hand brake mechanism is employed. The positive return stop 614 ensures that the rest position of the extension cylinder 606 always returns to the same location and minimizes the chance of misalignment. It is to be appreciated that the positive return stop 614 according to this example may be incorporated into the extension cylinder of any of the other examples discussed herein.

As shown in FIGS. 18-21, the cam surfaces 608A, 608B of the extension cylinder 606 each include first and second ramp surface portions 609, 610 extending at multiple ramp angles, as will be discussed in further detail below, and has a single mean diameter D from the center of the extension cylinder 606.

According to the example shown in FIGS. 18-21, the extension cylinder 606 provides a double angle, single mean diameter hand brake lifter mechanism. The extension cylinder 606 is particularly suitable for use in brake riggings that provide for limited lifter lever arm swing or limited translation of the lifter lever arm. According to one example of the disclosure, the extension cylinder 606 is specifically designed to interface with India RDSO Bogie Open Wagon Type 'BOXN' and 'BOXNHS.' It is to be appreciated that the extension cylinder 606 may be configured to interface with many different types of car structure. The extension cylinder 606, according to this example, has limits on the achievable lever ratio due to restrictions resulting from existing freight car design. As the extension cylinder 606, according to this example, is constrained in rotation, the lifter lever arm 615 is reduced in length and the ramp angle of each cam surface 608A, 608B is optimized for minimum force in the first ramp surface portion 609 (low translation/ rotation of the lifter lever arm, high stroke of the piston rod) and optimized for maximum force in the second ramp surface portion 610 (high translation/rotation of the lifter lever arm, low stroke of the piston rod).

Figure 22:
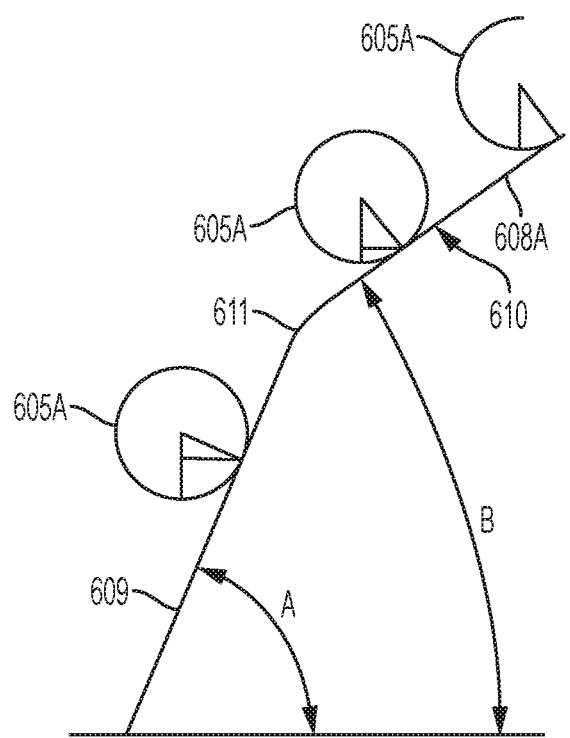
FIG. 22 is a schematic drawing illustrating a linearization of an engagement between a double ramp surface of an extension cylinder and a piston rod according to an example of the present disclosure.
Figure 23:
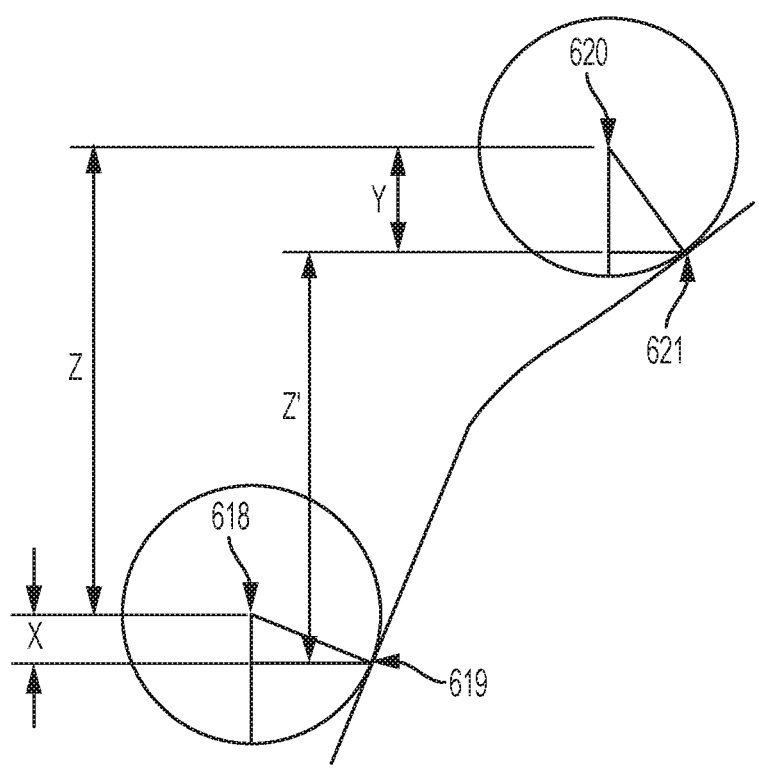
FIG. 23 is a schematic drawing illustrating an enlarged linearization of the engagement between a portion of the double ramp surface and the piston rod according to the example of FIG. 22.

Further details of the cam surfaces 608A, 608B of the extension cylinder 606 according to the example of FIGS. 18-21, are illustrated in FIGS. 22 and 23, which are schematics depicting the ramp angle of an exemplary double angle ramp surface. The vertical dimension of FIGS. 22 and 23 represents the linear piston stroke, and the horizontal dimension of FIGS. 22 and 23 represents the rotation of the extension cylinder 606 or the cam profile distance. As shown in FIG. 22, the first ramp surface portion 609 extends at a first angle A. The lateral protrusion 605A interfaces the piston rod 603 with the cam surface 608A. A transition 611 is defined between the first ramp surface portion 609 and the second ramp surface portion 610 extending at a second angle B. As shown in FIG. 22, the first angle A of the first ramp surface portion 609, which engages the lateral protrusion 605A when the piston rod 603 is in the retracted position, is greater than the second angle B of the second ramp surface portion 610, which engages the lateral protrusion 605A when the piston rod 603 is near the extended position.

Brake system slack take-up occurs at very low force values. As such, the ramp angle and mean diameter of the cam surfaces 608A, 608B, according to the present examples, are designed to have low lever arm movement and high piston stroke during an initial part of the piston stroke from the retracted position to the extended position. This equates to a low system lever ratio (~0.20:1) or a steep first angle A for the first ramp surface portion 609.

After the transition 611, the second ramp surface portion 610 of the extension cylinder 606 applies a high force value, i.e., the brake shoes of the brake rigging are contacting the wheels, the second angle B of the second ramp surface portion 610 is decreased, and the movement of the lifter lever arm 615 is increased. This equates to a high lever ratio (~1.5:1).

As discussed above, the cam surface 608A, according to the example of FIGS. 22 and 23, is particularly suitable for use in connection with hand brake mechanisms with limited lever arm movement designed to optimize the hand brake load for the mechanism.

Another advantage of the double angle cam surface 608A according to the example of FIGS. 22 and 23 is demonstrated in FIG. 23. As shown in FIG. 23, a vertical distance X from a center 618 of the lateral protrusion to a tangent point 619 between the lateral protrusion 605A and the first ramp surface portion 609 as the lateral protrusion 605A rolls/slides along the first ramp surface portion 609 is less than a vertical distance Y from a center 620 of the lateral protrusion 605A to a tangent point 621 between the lateral protrusion 605A and the second ramp surface portion 610 as the lateral protrusion 605A rolls/slides along the second ramp surface portion 610. Accordingly, with the change between the first angle A of the first ramp surface portion 609 and the second angle B of the second ramp surface portion 610, the stroke distance Z between the two center points 618, 620 of the lateral protrusion 605A is greater than the stroke distance Z' between the two tangent points 619, 621 where the lateral protrusion 605A contacts the ramp surface portions 609, 610. For a system requiring minimal lever arm movement, this behavior adds to the piston stroke as compared to a single angle ramp.

ADDITIONAL EXAMPLES

According to another example of the present disclosure, the double angle ramp surface of the extension cylinder, discussed above with reference to FIGS. 18-23, is provided having two mean diameters with respect to the center of the extension cylinder. The advantage of the double diameter extension cylinder is for system optimization during conditions of limited lever arm movement. Normally, during low force, low lever arm movement, the ideal mean diameter is as large as possible. However, during high force, low lever arm movement, the ideal mean diameter is as small as possible. With the double angle single ramp design, some compromise is necessary on the mean diameter of the ramp surface. When the length of the lifter lever arm is held constant, the lower or first angle of the first ramp surface is optimized for force by a large mean diameter. Conversely, the upper or second angle of the second ramp surface is optimized for force by a small mean diameter. The relationship of Equations (6) and (7) provided above explains the seemingly contradictory relationship between the mean diameter of the ramp surface and the force output.

The standard efficiency ($\xi_{rigging}$) of Casnub 22HS, 22NL, and 22NLB bogie wagons can be found in RDSO drawing #WD-09034-S-09 and is claimed to be $\xi_{rigging}$=0.25, for an input force to the cylinder of 1036.26 kg. With an AAR vertical Wheel Type Hand Brake, Group N, the input force is 1370 kg, including efficiency loss. This is the force that can be applied to the extension cylinder/hand brake connection.

The current rigging for Casnub 22HS, 22NL, and 22NLB bogie wagons involves many components, levers, and modifications to the wagon to install. According to the above-described examples, the inclusion of the extension cylinder in the brake rigging allows for use of a wheel-type hand brake mechanism that requires sufficiently fewer components to be installed on the brake rigging.

The extension cylinder according to the above-described examples may be installed on newly manufactured railcars or may be implemented as a retrofit on existing railcar assemblies, such as the Cardwell Westinghouse Cylinder Assemblies for the India Brake System.

Further examples of the present disclosure will now be described in the following numbered clauses.

Clause 1: A brake actuator for a brake rigging in a railway brake system, comprising; a brake cylinder (500, 600); a piston rod (503, 603) extensibly disposed on the brake cylinder (500, 600) and operatively connected to a piston assembly (504, 604) in the brake cylinder (500, 600), the piston rod (503, 603) being configured to be moved by the piston assembly (504, 604) in a reciprocal axial motion between extended and retracted positions with respect to the brake cylinder (500, 600) and comprising at least one lateral protrusion (505A, 505B, 605A, 605B) extending laterally therefrom; and an extension cylinder (506, 606) disposed on the brake cylinder (500, 600) at least partially surrounding the piston rod (503, 603), the extension cylinder (506, 606) comprising at least one cam surface (508A, 508B, 608A, 608B) engaged by the at least one lateral protrusion (505A, 505B, 605A, 605B) of the piston rod (503, 603), wherein the extension cylinder (506, 606) is configured to be operatively connected to a hand brake mechanism and to be actuated by the hand brake mechanism to rotate such that the at least one cam surface (508A, 508B, 608A, 608B) engages the at least one lateral protrusion (505A, 505B, 605A, 605B) of the piston rod (503, 603) to cause the piston rod (503, 603) to move to the extended position.

Clause 2: The brake actuator according to clause 1, wherein the at least one cam surface (508A, 508B) of the extension cylinder (506) comprises a ramp surface extending at a single ramp angle.

Clause 3: The brake actuator according to clause 1, wherein the at least one cam surface (608A, 608B) of the extension cylinder (606) comprises a ramp surface (609, 610) extending at multiple ramp angles (A, B).

Clause 4: The brake actuator according to clause 3, wherein the ramp angle (A, B) of the ramp surface (609, 610) is greater in a portion of the ramp surface (609) that engages the at least one lateral protrusion (605A, 605B) when the piston rod (603) is in the retracted position than in a portion of the ramp surface (610) that engages the at least one lateral protrusion (605A) when the piston rod (603) is near the extended position.

Clause 5: The brake actuator according to any one of clauses 1-4, wherein the at least one cam surface (508A, 508B, 608A, 608B) of the extension cylinder (506, 606) extends at a single mean diameter (D).

Clause 6: The brake actuator according to any one of clauses 1-4, wherein the at least one cam surface (508A, 508B, 608A, 608B) of the extension cylinder (506, 606) extends at multiple mean diameters.

Clause 7: The brake actuator according to any one of clauses 1-6, wherein the extension cylinder (506, 606) is rotatably supported on a non-pressure head (502, 602) of the brake cylinder (500, 600) by a lifter bearing (509, 612).

Clause 8: The brake actuator according to any one of clauses 1-7, wherein the piston rod (503, 603) is extensibly supported in a non-pressure head (502, 602) of the brake cylinder (500, 600) by a piston rod bearing (510, 613).

Clause 9: The brake actuator according to any one of clauses 1-8, wherein the at least one lateral protrusion (505A, 505B, 605A, 605B) of the piston rod (503, 603) is configured to slide along the at least one cam surface (508A, 508B, 608A, 608B) of the extension cylinder (506, 606).

Clause 10: The brake actuator according to clause 9, wherein the at least one lateral protrusion (505A, 505B, 605A, 605B) comprises a rotatable bearing (511) configured to slide and roll along the at least one cam surface (508A, 508B, 608A, 608B).

Clause 11: The brake actuator according to any one of clauses 1-10, further comprising a positive return stop (614) configured to return the at least one cam surface (608A, 608B) of the extension cylinder (606) to a starting position with respect to the piston rod (603) when the hand brake mechanism is released.

Clause 12: The brake actuator according to any one of clauses 1-11, wherein the extension cylinder (506, 606) further comprises a lever arm (512, 615) configured to be engaged by the hand brake mechanism.

Clause 13: The brake actuator according to any one of clauses 1-12, wherein the at least one lateral protrusion (505A, 505B, 605A, 605B) comprises two lateral protrusions (505A, 505B, 605A, 605B) extending from the piston rod (503, 603) in opposing lateral directions, the at least one cam surface (508A, 508B, 608A, 608B) comprises two cam surfaces (508A, 508B, 608A, 608B) disposed on opposite sides of the extension cylinder (506, 606), and each of the two cam surfaces (508A, 508B, 608A, 608B) is engaged by a respective one of the two lateral protrusions (505A, 505B, 605A, 605B).

Clause 14: A brake cylinder assembly (500, 600) for a railway brake actuator, comprising: a cylinder body (501, 601); a piston assembly (504, 604) disposed in the cylinder body (501, 601); a piston rod (503, 603) operatively connected to the piston assembly (504, 604) and configured to be moved by the piston assembly (504, 604) in a reciprocal axial motion between extended and retracted positions with respect to the cylinder body (501, 601), the piston rod (503, 603) comprising at least one lateral protrusion (505A, 505B, 605A, 605B) extending laterally therefrom; and an extension cylinder (506, 606) disposed on the cylinder body (501, 601) at least partially surrounding the piston rod (503, 603), the extension cylinder (506, 606) comprising at least one cam surface (508A, 508B, 608A, 608B) engaged by the at least one lateral protrusion (505A, 505B, 605A, 605B) of the piston rod (503, 603), wherein the extension cylinder (506, 606) is configured to be operatively connected to a hand brake mechanism and to be actuated by the hand brake mechanism to rotate such that the at least one cam surface (508A, 508B, 608A, 608B) engages the lateral protrusion (505A, 505B, 605A, 605B) of the piston rod (503, 603) to cause the piston rod (503, 603) to move to the extended position.

Clause 15: The brake cylinder assembly (500) according to clause 14, wherein the at least one cam surface (508A, 508B) of the extension cylinder (506) comprises a ramp surface extending at a single ramp angle.

Clause 16: The brake cylinder assembly (600) according to clause 14, wherein the at least one cam surface (608A, 608B) of the extension cylinder (606) comprises a ramp surface (609, 610) extending at multiple ramp angles (A, B).

Clause 17: The brake cylinder assembly (500, 600) according to any one of clauses 14-16, wherein the extension cylinder (506, 606) is rotatably supported on a non-pressure head (502, 602) of the cylinder body (501, 601) by a lifter bearing (509, 612).

Clause 18: The brake cylinder assembly (500, 600) according to any one of clauses 14-17, wherein the at least one lateral protrusion (505A, 505B, 605A, 605B) of the piston rod (503, 603) is configured to slide along the at least one cam surface (508A, 508B, 608A, 608B) of the extension cylinder (506, 606).

Clause 19: The brake cylinder assembly (600) according to any one of clauses 14-18, further comprising a positive return stop (614) configured to return the at least one cam surface (608A, 608B) of the extension cylinder (606) to a starting position with respect to the piston rod (603) when the hand brake mechanism is released.

Clause 20: The brake cylinder assembly (500, 600) according to any one of clauses 14-19, wherein the at least one lateral protrusion (505A, 505B, 605A, 605B) comprises two lateral protrusions (505A, 505B, 605A, 605B) extending from the piston rod (503, 603) in opposing lateral directions, the at least one cam surface (508A, 508B, 608A, 608B) comprises two cam surfaces (508A, 508B, 608A, 608B) disposed on opposite sides of the extension cylinder (506, 606), and each of the two cam surfaces (508A, 508B, 608A, 608B) is engaged by a respective one of the two lateral protrusions (505A, 505B, 605A, 605B).

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A brake actuator, comprising:
a brake cylinder having a piston assembly;
a piston rod extensibly disposed on the brake cylinder and operatively connected to the piston assembly in the brake cylinder, the piston rod configured to be moved by the piston assembly in a reciprocal axial motion between extended and retracted positions with respect to the brake cylinder, the piston rod comprising at least one lateral protrusion laterally extending therefrom; and
an extension cylinder disposed on the brake cylinder at least partially surrounding the piston rod, the extension cylinder comprising at least one cam surface engaged by the at least one lateral protrusion of the piston rod, wherein the cam surface includes at least one rotational component and at least one translational component, wherein the extension cylinder is configured to be operatively connected to a hand brake mechanism and to be actuated by the hand brake mechanism to rotate such that the at least one cam surface engages the at least one lateral protrusion of the piston rod to cause the piston rod to move between the extended position and the retracted position, wherein moving the piston rod between the extended position and the retracted position includes the extension cylinder moving in a rotational direction corresponding to the at least one rotational component of the cam surface and a translational direction corresponding to the at least one translational component of the cam surface while the cam surface engages the at least one lateral protrusion.

2. The brake actuator according to claim 1, wherein the at least one cam surface of the extension cylinder comprises a ramp surface extending at a single ramp angle.

3. The brake actuator according to claim 1, wherein the at least one cam surface of the extension cylinder comprises a ramp surface extending at multiple ramp angles.

4. The brake actuator according to claim 3, wherein the ramp angle of the ramp surface is greater in a portion of the ramp surface that engages the at least one lateral protrusion when the piston rod is in the retracted position than in a portion of the ramp surface that engages the at least one lateral protrusion when the piston rod is near the extended position.

5. The brake actuator according to claim 1, wherein the at least one cam surface of the extension cylinder extends at a single mean diameter.

6. The brake actuator according to claim 1, wherein the at least one cam surface of the extension cylinder extends at multiple mean diameters.

7. The brake actuator according to claim 1, wherein the extension cylinder is rotatably supported on a non-pressure head of the brake cylinder by a lifter bearing.

8. The brake actuator according to claim 1, wherein the piston rod is extensibly supported in a non-pressure head of the brake cylinder by a piston rod bearing.

9. The brake actuator according to claim 1, wherein the at least one lateral protrusion of the piston rod is configured to slide along the at least one cam surface of the extension cylinder.

10. The brake actuator according to claim 9, wherein the at least one lateral protrusion comprises a rotatable bearing configured to slide and roll along the at least one cam surface.

11. The brake actuator according to claim 1, further comprising a positive return stop configured to return the at least one cam surface of the extension cylinder to a starting position with respect to the piston rod when the hand brake mechanism is released.

12. The brake actuator according to claim 1, wherein the extension cylinder further comprises a lever arm configured to be engaged by the hand brake mechanism.

13. The brake actuator according to claim 1, wherein
the at least one lateral protrusion comprises two lateral protrusions extending from the piston rod in opposing lateral directions,
the at least one cam surface comprises two cam surfaces disposed on opposite sides of the extension cylinder, and
each of the two cam surfaces is engaged by a respective one of the two lateral protrusions.

14. A brake cylinder assembly, comprising:
a cylinder body;
a piston assembly disposed in the cylinder body;
a piston rod operatively connected to the piston assembly and configured to be moved by the piston assembly in a reciprocal axial motion between extended and retracted positions with respect to the cylinder body, the piston rod comprising at least one lateral protrusion laterally extending therefrom; and
an extension cylinder disposed on the cylinder body at least partially surrounding the piston rod, the extension cylinder comprising at least one cam surface engaged by the at least one lateral protrusion of the piston rod, wherein the cam surface includes at least one rotational component and at least one translational component,
wherein the extension cylinder is configured to be operatively connected to a hand brake mechanism and to be actuated by the hand brake mechanism to rotate such that the at least one cam surface engages the at least one lateral protrusion of the piston rod to cause the piston rod to move between the extended position and the retracted position, wherein moving the piston rod between the extended position and the retracted position includes the extension cylinder moving in a rotational direction corresponding to the at least one rotational component of the cam surface and a translational direction corresponding to the at least one translational component of the cam surface while the cam surface engages the at least one lateral protrusion.

15. The brake cylinder assembly according to claim 14, wherein the at least one cam surface of the extension cylinder comprises a ramp surface extending at a single ramp angle.

16. The brake cylinder assembly according to claim 14, wherein the at least one cam surface of the extension cylinder comprises a ramp surface extending at multiple ramp angles.

17. The brake cylinder assembly according to claim 14, wherein the extension cylinder is rotatably supported on a non-pressure head of the cylinder body by a lifter bearing.

18. The brake cylinder assembly according to claim 14, wherein the at least one lateral protrusion of the piston rod is configured to slide along the at least one cam surface of the extension cylinder.

19. The brake cylinder assembly according to claim 14, further comprising a positive return stop configured to return the at least one cam surface of the extension cylinder to a starting position with respect to the piston rod when the hand brake mechanism is released.

20. The brake cylinder assembly according to claim 14, wherein
the at least one lateral protrusion comprises two lateral protrusions extending from the piston rod in opposing lateral directions,
the at least one cam surface comprises two cam surfaces disposed on opposite sides of the extension cylinder, and
each of the two cam surfaces is engaged by a respective one of the two lateral protrusions.

* * * * *